(12) United States Patent  (10) Patent No.: US 7,921,628 B2
Meester  (45) Date of Patent: *Apr. 12, 2011

(54) SMALL SCALE TOMATO HARVESTER

(75) Inventor: David Meester, Fresno, CA (US)

(73) Assignee: Westside Equipment Company, Crows Landing, CA (US)

( * ) Notice: Subject to any disclaimer, the term of this patent is extended or adjusted under 35 U.S.C. 154(b) by 1037 days.

This patent is subject to a terminal disclaimer.

(21) Appl. No.: 11/514,710

(22) Filed: Aug. 31, 2006

(65) Prior Publication Data

US 2007/0000224 A1  Jan. 4, 2007

Related U.S. Application Data

(63) Continuation-in-part of application No. 10/942,078, filed on Sep. 14, 2004, now Pat. No. 7,581,375.

(51) Int. Cl.
    *A01D 45/00* (2006.01)
(52) U.S. Cl. ........................... 56/327.1; 171/27
(58) Field of Classification Search ............... 56/327.1; 171/14, 27
    See application file for complete search history.

(56) References Cited

U.S. PATENT DOCUMENTS

| | | |
|---|---|---|
| 672,320 A | 4/1901 | Ford |
| 2,280,364 A | 4/1942 | Atteslander |
| 2,745,238 A | 5/1956 | Hopkins |
| 2,757,503 A | 8/1956 | Hart |
| 2,886,936 A * | 5/1959 | Phelps .................... 56/328.1 |
| 3,286,774 A | 11/1966 | Lorenzen et al. |
| 3,308,924 A | 3/1967 | Hecox |
| 3,331,198 A | 7/1967 | Hill |
| 3,340,935 A | 9/1967 | Csimma |
| 3,344,591 A | 10/1967 | Christie et al. |
| 3,390,768 A | 7/1968 | Button .................... 209/665 |
| 3,413,789 A | 12/1968 | Studer |
| 3,473,613 A | 10/1969 | Boyce |
| 3,497,084 A | 2/1970 | Murrah |
| 3,521,739 A | 7/1970 | McRobert .................... 198/571 |
| 3,541,979 A | 11/1970 | Lorenzen |
| 3,566,881 A | 3/1971 | Link et al. |
| 3,584,690 A | 6/1971 | Taylor |

(Continued)

FOREIGN PATENT DOCUMENTS

CA  2272550  5/1998

(Continued)

OTHER PUBLICATIONS

FMC Foodtech—Sandei-Series SL Self-Propelled Harvester—7 pages Italy.

(Continued)

*Primary Examiner* — Alicia M Torres
(74) *Attorney, Agent, or Firm* — Mark D. Miller; Marcus N. NiBuduo

(57) ABSTRACT

The present invention is a compact fruit-vine harvester and separation system in which the harvested fruit travels along a vertical plane inside the harvester during processing, followed by a single turn for output. The system includes a machine and related methods for harvesting vine-borne crops. The machine provides for vine borne crops to be severed, separated, cleaned and machine-sorted along a straight path before making a single turn prior to exit. The machine incorporates a blower and/or suction system for efficient removal of unwanted dirt, vegetation and debris, and an optional roller to prevent clogging of the suction system.

54 Claims, 18 Drawing Sheets

U.S. PATENT DOCUMENTS

| | | | |
|---|---|---|---|
| 3,613,796 | A | 10/1971 | Cayton et al. |
| 3,618,617 | A | 11/1971 | Gates et al. |
| 3,656,488 | A | 4/1972 | Dumanowski et al. |
| 3,666,017 | A | 5/1972 | Gates et al. |
| 3,698,171 | A | 10/1972 | Hecht ............... 56/331 |
| RE27,528 | E | 11/1972 | Looker et al. |
| 3,760,574 | A | 9/1973 | Tassone |
| 3,772,194 | A | 11/1973 | Baden |
| 3,776,046 | A | 12/1973 | Jones, Jr. |
| 3,791,227 | A | 2/1974 | Cherry |
| 3,916,913 | A | 11/1975 | Looker et al. |
| 3,986,561 | A | 10/1976 | Bettencourt et al. ........ 171/14 |
| 3,999,613 | A | 12/1976 | Porter |
| 4,033,099 | A | 7/1977 | Friedel et al. |
| 4,052,992 | A | 10/1977 | Taylor |
| 4,060,133 | A | 11/1977 | Bettencourt et al. |
| 4,111,210 | A | 9/1978 | Freeman et al. |
| 4,118,311 | A | 10/1978 | Friedel et al. |
| 4,147,017 | A | 4/1979 | Cortopassi et al. ......... 56/16.5 |
| 4,150,528 | A | 4/1979 | Rendin |
| 4,157,005 | A | 6/1979 | Orlando et al. |
| 4,174,755 | A | 11/1979 | Siri |
| 4,175,621 | A | 11/1979 | Seem |
| 4,231,439 | A | 11/1980 | Hall, Jr. et al. |
| 4,232,506 | A | 11/1980 | Studer |
| 4,234,045 | A | 11/1980 | Porter |
| 4,257,218 | A | 3/1981 | McRobert |
| 4,262,477 | A | 4/1981 | Turold et al. |
| 4,262,750 | A | 4/1981 | Merkley |
| 4,281,764 | A | 8/1981 | Fowler, Jr. |
| 4,282,706 | A | 8/1981 | Orlando |
| 4,283,906 | A | 8/1981 | Scudder |
| 4,286,426 | A | 9/1981 | Orlando et al. |
| 4,292,792 | A | 10/1981 | Burton |
| 4,294,063 | A | 10/1981 | Bianchi |
| 4,329,836 | A | 5/1982 | Scudder |
| 4,335,570 | A | 6/1982 | Fitzmaurice |
| 4,336,682 | A | 6/1982 | Orlando |
| 4,340,237 | A | 7/1982 | Orlando |
| 4,341,062 | A | 7/1982 | Scudder |
| 4,414,934 | A | 11/1983 | Vogl et al. |
| 4,418,521 | A | 12/1983 | Orlando et al. |
| 4,426,832 | A | 1/1984 | Porter |
| 4,432,190 | A | 2/1984 | Orlando |
| 4,435,950 | A | 3/1984 | Deux et al. |
| 4,471,876 | A | 9/1984 | Stevenson, Jr. et al. |
| 4,472,928 | A | 9/1984 | Easton |
| 4,498,569 | A | 2/1985 | Tanaka et al. |
| 4,531,630 | A | 7/1985 | Oury et al. |
| 4,569,188 | A | 2/1986 | Alper et al. |
| 4,570,426 | A | 2/1986 | Bettencourt |
| 4,584,826 | A | 4/1986 | Bettencourt et al. |
| 4,589,425 | A * | 5/1986 | Mitchell, Jr. ............... 460/99 |
| 4,662,162 | A | 5/1987 | Bettencourt et al. |
| 4,793,128 | A | 12/1988 | Creed |
| 4,893,346 | A | 1/1990 | Bishop |
| 4,915,671 | A | 4/1990 | Johnson |
| 4,927,440 | A | 5/1990 | Butler et al. |
| 4,936,082 | A | 6/1990 | Majkrzak |
| 4,956,966 | A | 9/1990 | Patterson |
| 4,965,993 | A | 10/1990 | Butler et al. |
| 4,982,558 | A | 1/1991 | Korthuis |
| 5,044,147 | A | 9/1991 | Klinner |
| 5,088,569 | A | 2/1992 | Checcucci |
| 5,099,636 | A | 3/1992 | Yoder |
| 5,103,623 | A | 4/1992 | Herrett |
| 5,113,644 | A | 5/1992 | Windmuller et al. |
| 5,180,122 | A | 1/1993 | Christian et al. |
| 5,197,269 | A | 3/1993 | Meester |
| 5,250,801 | A | 10/1993 | Grozinger et al. |
| 5,296,702 | A | 3/1994 | Beck et al. |
| 5,314,071 | A | 5/1994 | Christian et al. |
| 5,316,519 | A | 5/1994 | Johnson |
| 5,318,475 | A | 6/1994 | Schrock et al. |
| 5,370,579 | A | 12/1994 | Brown et al. |
| 5,372,547 | A | 12/1994 | Brown et al. |
| 5,480,353 | A | 1/1996 | Garza, Jr. |
| 5,491,333 | A | 2/1996 | Skell et al. |
| 5,495,708 | A | 3/1996 | Scott et al. |
| 5,573,459 | A | 11/1996 | Meester |
| 5,585,626 | A | 12/1996 | Beck et al. |
| 5,647,194 | A | 7/1997 | Scott et al. |
| 5,685,773 | A | 11/1997 | Meester et al. |
| 5,702,301 | A | 12/1997 | Meester |
| 5,813,910 | A | 9/1998 | Meester et al. |
| 5,842,334 | A | 12/1998 | Slates |
| 5,860,859 | A | 1/1999 | Meester |
| 5,865,675 | A | 2/1999 | Meester |
| 5,895,910 | A | 4/1999 | Christian |
| 5,901,539 | A | 5/1999 | Sandei |
| 5,908,352 | A | 6/1999 | Meester et al. |
| 5,921,074 | A | 7/1999 | Scott et al. |
| 6,033,305 | A | 3/2000 | Perez et al. |
| 6,119,442 | A * | 9/2000 | Hale ............... 56/10.2 H |
| 6,257,978 | B1 | 7/2001 | Meester |
| 6,298,644 | B1 | 10/2001 | Sandei |
| 6,350,198 | B1 | 2/2002 | Sandei |
| 6,415,592 | B1 | 7/2002 | Borchard |
| 7,051,505 | B2 | 5/2006 | Brannstrom |
| 2004/0050029 | A1 | 3/2004 | Brannstrom |
| 2006/0053765 | A1 | 3/2006 | Meester |

FOREIGN PATENT DOCUMENTS

| | | |
|---|---|---|
| DE | 4313320 A1 | 10/1994 |
| WO | WO98/21933 A1 | 5/1998 |
| WO | WO2004/006646 A2 | 1/2004 |

OTHER PUBLICATIONS

Guaresi—A complete range of hi-tech tomato harvesters G-89/93—12 pages Italy.

Pomac—Espressioni Di Tecnologia Technical Terms Linea Rossa Raccoglitrici Per Pomodori Tomato Harvesters—10 pages—Italy.

Gallignani—Polaris 2000—6 pages—Italy.

* cited by examiner

SMALL SCALE TOMATO HARVESTER

This is a continuation-in-part of application Ser. No. 10/942,078 filed on Sep. 14, 2004, now U.S. Pat. No. 7,581,375, which is incorporated herein in its entirety by this reference

BACKGROUND OF THE INVENTION

1. Field of the Invention

The present invention relates to machines and methods for harvesting food crops, and more particularly, to improved small-scale machines and related methods for separating larger volumes of vine-borne crops from their vines while effectively removing unwanted dirt, vegetation and debris, minimizing damage to the fruit itself, and promoting better sorting of fruit.

2. Description of the Prior Art

Vine-borne crops have traditionally been harvested and processed by hand. However, such manual harvesting and processing was often tedious, time-consuming and expensive. Various machines, such as the one disclosed in U.S. Pat. No. 6,033,305, have been developed over the years to automate part, or all, of this process. These machines are able to harvest vine-borne crops from the ground at much faster speeds than humans. However, these machines were often inefficient in other aspects of the harvesting process. Early harvesting machines severed entire plants and dropped them upon the ground, with the desired crops remaining affixed to the plants. Then, collection devices would retrieve the mixture of vegetation, dirt and debris for processing. Human sorters would then be required to sort through the mixture to separate the crops from the rest, and extract the former. The human sorters had to quickly process these mixtures to prevent a backlog. As a result, some suitable crops were lost because they were too far entangled within the plants, or simply overlooked by the human sorters.

Various devices have been developed over the years to improve the mechanized harvesting process, and to minimize the need for human sorters. For example, U.S. Pat. Nos. 4,257,218, 4,335,570, and 6,257,978 all disclose harvesting machines utilizing at least one form of agitating device (such as vibrating shaker heads or conveyor belts) to dislodge tomatoes from the vines. Several harvesting machines, such as those disclosed in U.S. Pat. Nos. 6,257,978 and 6,033,305, also utilize forced air pressure systems to further remove dirt and debris.

Unfortunately, larger is not always better. While wider and larger machines are generally capable of harvesting and processing a higher volume of vine-borne crops, many road and/or field situations make it impossible or impractical to use or bring these large machines in to perform the desired harvesting. Such machines are also more difficult to maneuver. Such limited maneuverability may require the machine operator to spend additional time repositioning the machines to process each row of crops, or cause the machines to inadvertently trample one or more rows. In addition, larger machines tend to weigh more, and the added weight not only affects maneuverability (e.g. turning), it also makes the larger, heavier machines unusable in moist or muddy fields where they tend to bog down. It is therefore desirable to provide a smaller scale machine that is capable of harvesting larger volumes of vine-borne crops.

In addition, the design of many existing large and small-scale machines may cause damage to the fruit by imparting numerous drops and/or turns during processing. Many machines require the fruit to drop a distance of several feet over the course of processing through the machine, and to make several turns during the process. Each drop and each turn provides another point where the fruit may be damaged, so it is desirable to minimize the number and/or distance that the fruit drops through the machine, and to minimize the number of turns the fruit makes as it travels through the machine.

Effective separating and sorting of harvested fruit is also important. More efficient removal of dirt, vegetation, trash and debris as well as more accurate sorting of fruit is possible when the harvested materials are uniformly dispersed, and not bunched together. An unfortunate side effect of machines in which the fruit makes multiple turns is that the fruit and associated trash and debris tends to bunch together. Rather than the fruits being evenly spaced upon the conveyors (so that they may be easily examined and processed), these corners cause the fruits to become crowded as they are transported onto an intersecting conveyor potentially forming windrows, making them more difficult to inspect and sort. This bunching makes removal of the trash and debris more difficult, and once removed, the bunching of the harvested fruit makes sorting more difficult as well. Furthermore, each turn involves a drop from one conveyor to another, risking additional damage to the fruit, and requiring more maintenance and cleanup from breakage. Transverse turns also tend to increase the overall width and size of the harvester machine. All of these consequences make it even more desirable to minimize the number of turns the fruit makes as it travels through the machine.

Blowers for cleaning trash and debris out of the fruit stream have been used in existing machines. Air from the blower is typically directed between two conveyors into the fruit stream as the fruit makes a ninety degree turn at the rear of the machine. The trash and debris is blown far enough to clear the receiving conveyor and drop off to the ground. It is therefore desirable to provide a machine with a blower unit that does not require the fruit to be subjected to the problems associated with unnecessary turns.

Suction units have also been used in existing harvesting machines for pulling the trash off the fruit stream on each side of the harvester, with the fan positioned in the typical application directly above a pickup point as fruit moves from one conveyor to another. This is not feasible for use on a small scale machine because of vertical space limitations of fitting a sufficiently large enough fan without lengthening the machine further or raising the height and creating shipping problems. The additional single conveyor width compounds the problem. It is therefore desirable to provide an effective suction system that may be used in a small scale machine.

It is therefore desirable to provide a small-scale vine-borne crop harvesting machine capable of processing a large volume of crops that is usable in a wide variety of field situations where larger machines cannot be used. It is further desirable that the harvesting machine effectively process vine-borne crops with minimum potential damage to the fruit. It is further desirable that the machine provide a minimum number of drops and turns so that the fruit is less susceptible to damage, so that trash and debris may be more effectively removed, and so that the fruit itself may be more efficiently sorted.

SUMMARY OF THE INVENTION

The present invention provides compact fruit-vine harvesters and separation systems in which the harvested fruit travels along a vertical plane or path during processing inside the machine, and makes only one ninety-degree turn following such processing in order to exit. The systems include machines and related methods for harvesting vine-borne crops. One embodiment of the machine is relatively compact, having a frame that is dimensioned such that its width is substantially the same as the wheel or track base so that it may travel on narrow roads, and be used in narrow field conditions. The machines provide for vine borne crops to be severed, separated, cleaned and machine-sorted along a single substantially vertical plane or straight (unturning) path inside the machine before making a single turn just prior to exit. Harvested fruit passing through the machines have fewer drops than seen in existing machines (typically two fewer drops). The machines incorporate a blower system, or a suction system, or a combination of blower and suction system for efficient removal of unwanted dirt, vegetation and debris.

In one embodiment, a severing device is provided at the forward end of a machine for severing fruit-laden vines from the ground. A first conveyor is provided that brings the severed fruit-laden vines to an upper position in the machine. It is preferred that this pre-processing (severing and depositing into the machine) be accomplished along the same vertical plane as the remaining processing inside the machine. However, multiple severing devices and/or multiple conveyors may be used to remove and deposit the vines into the machine that may not necessarily be oriented along the same vertical plane. In several embodiments, the severed fruit-laden vines cross an adjustable gap and are delivered onto a second conveyor, the gap allowing loose dirt and debris to fall through the machine to a dirt cross conveyor. In several embodiments, the material on this conveyor is passed through a vision system which ejects the red fruit back into the machine as the dirt and debris pass through to the ground. The fruit-laden vines are introduced into a rotating shaker having tines that engage and loosen the vines, causing the fruit to be dislodged as it shakes. The dislodged fruit drops onto a second conveyor below the shaker, and the vines are deposited onto a third conveyor. While traveling along the third conveyor, which is provided with large slots or as a wider pitch belted chain so that fruit can pass through, additional agitation may be imparted to the vines to dislodge any remaining fruit which falls through and is returned to the second conveyor. All of the conveyors are set up relatively close to each other so as to minimize the dropping distance of the fruit. These conveyors are all lined up substantially along the same vertical plane, so that the fruit and related materials are not turned and remain uniformly dispersed across the width of the conveyors.

Some dirt, debris, and vegetation may be deposited on the second conveyor along with the dislodged fruit. To remove this remaining trash, in several embodiments the second conveyor delivers the fruit and trash across an adjustable gap in which a strong upward air flow is provided through a nozzle attached to a blower below. The nozzle extends along the width of the second conveyor so that all fruit and trash is affected thereby. The airflow may be adjusted so that it is strong enough to blow away substantially all loose dirt, debris and vegetation without blowing away the fruit itself. The airflow also tends to remove trash and vegetation that may have become adhered to the second conveyor because of moisture or the like.

In some embodiments, an intake opening for a variable speed suction unit may be provided above the gap and blower nozzle to receive and remove all of the trash that is blown free by the lower nozzle. In other embodiments, one or more suction units are provided without any blower, preferably located along one or both sides of the fruit path, with special ducting to focus the suction over the fruit traveling through the machine along the vertical plane.

In some embodiments of the dual system using both blower and suction, one or more flaps are pivotally provided in the ducting for the blower system. Such flaps are activated when it is sensed that airflow has been affected by a large piece of vine engaged (clogged) in the suction system. When this condition is sensed, as, for example, a change in static pressure, a flap on the blower nozzle is moved so as to redirect the air flow forward in the machine and partially deadhead the blower, cutting off the airflow until the clog is cleared. This prevents trash that should be sucked up by the clogged suction unit from being blown all over the cleaned fruit on the conveyor. Once the clog is cleared, the normal condition is again sensed, and the flaps are returned to their original position(s) for normal operation.

In several embodiments, one or more continuously rotating rollers may be provided adjacent to the upper intake opening to dislodge any large pieces of vegetation or trash to prevent the upper opening from becoming clogged. Each roller itself is preferably smooth so that it does not become entangled with the vegetation or trash, but it may be provided with teeth, lagging, textured covering or tines to engage such materials if so desired. Each roller may rotate in either direction, so long as it tends to keep the vegetation and trash from clogging the intake opening of the upper suction unit.

The cleaned fruit that passes through the blower/suction gap is then deposited onto a fourth conveyor that is also in line with the three previous conveyors. The fourth conveyor takes the fruit to an automatic sorting unit which kicks out unwanted fruit according to its programmed instructions. Since the fruit has not traveled through any turns up to this point, it remains evenly separated on the fourth conveyor thereby improving the sorting process. Then, finally, the fruit makes its one and only turn where it is deposited onto a transversally oriented conveyor. Here, hand sorting may be performed, followed by deposit of the fruit onto a final conveyor which takes it up and out of the machine, usually for deposit into a waiting hopper alongside the machine. In an alternative embodiment, the transversally oriented conveyor and the final conveyor are one and the same, making the fruit available for sorting and then elevating it out of the machine to the hopper waiting alongside.

It is therefore a primary object of the present invention to provide a machine for harvesting vine-borne crops in which the harvested fruit travels along a substantially straight path within the machine as the fruit is separated from the vines, cleaned and sorted, prior to making a single turn followed by exit.

It is also an important object of the invention to provide a machine for harvesting vine-borne crops in which the harvested fruit travels a minimal distance from the uppermost to the lowermost point during processing, reducing the overall distance the fruit drops through the machine in order to reduce the potential for damage to the fruit.

It is also an important object of the invention to provide a machine for harvesting vine-borne crops in which the harvested fruit is uniformly dispersed as it is conveyed through the machine to facilitate better removal of unwanted trash and debris, and to facilitate better sorting of fruit.

It is also an important object of the invention to provide a machine for harvesting vine-borne crops in which unwanted dirt, vegetation and debris is removed through the action of an adjustable blower device provided along the path of travel through the machine.

It is also an important object of the invention to provide a machine for harvesting vine-borne crops in which unwanted dirt, vegetation and debris is removed through the action of adjustable suction device(s) provided along the path of travel through the machine.

It is also an important object of the invention to provide a machine for harvesting vine-borne crops in which unwanted dirt, vegetation and debris is removed through the dual action of an adjustable lower blower device and an adjustable upper suction device that are provided adjacent to each other along the path of travel through the machine.

It is also an important object of the invention to provide a small-scale machine for harvesting large volumes of vine-borne crops that may be deployed in vineyards and fields where larger machines cannot be efficiently used.

It is also an important object of the invention to provide improved methods for harvesting and processing vine-borne crops.

Additional objects of the invention will be apparent from the detailed descriptions and the claims herein.

DETAILED DESCRIPTION

Figure 1:
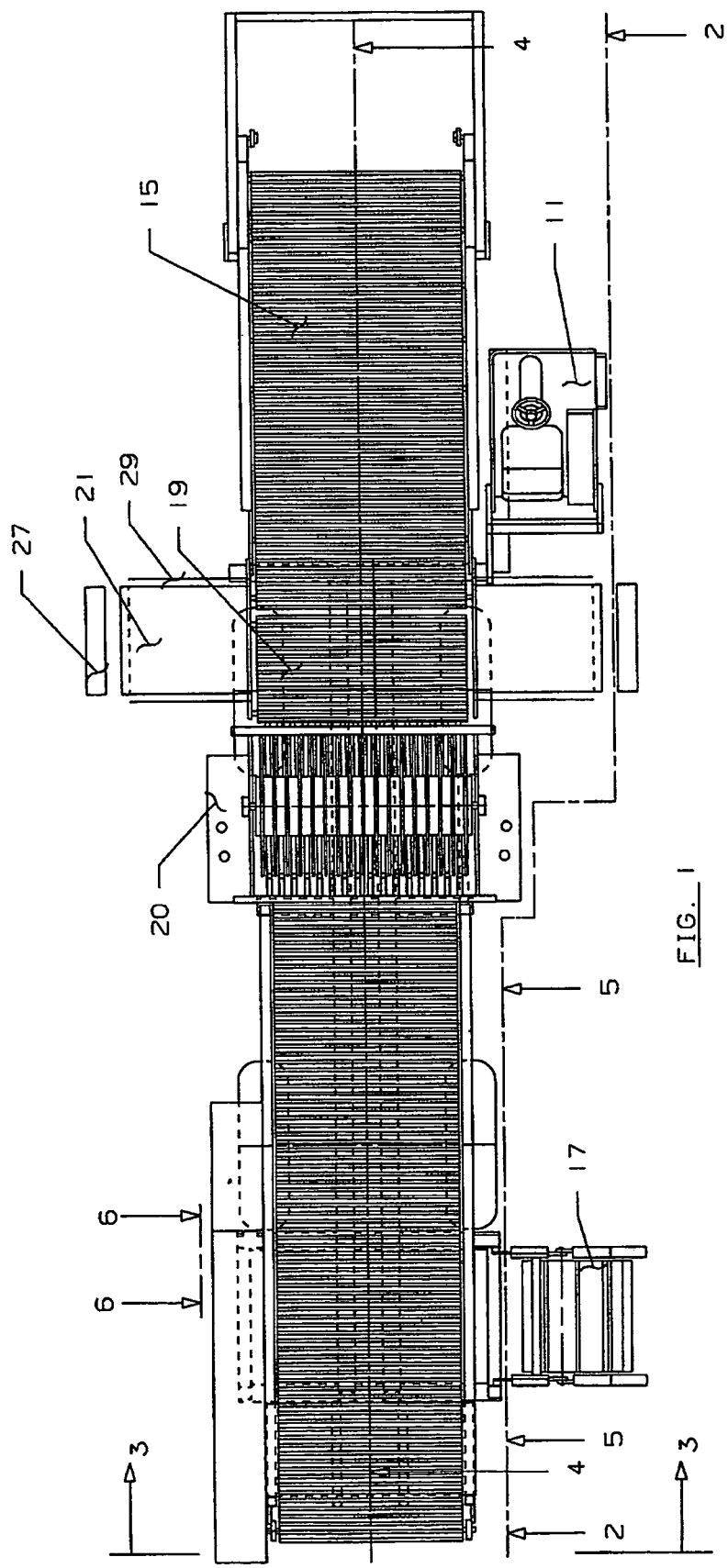
FIG. 1 is a top view of an embodiment of the present invention.
Figure 2:
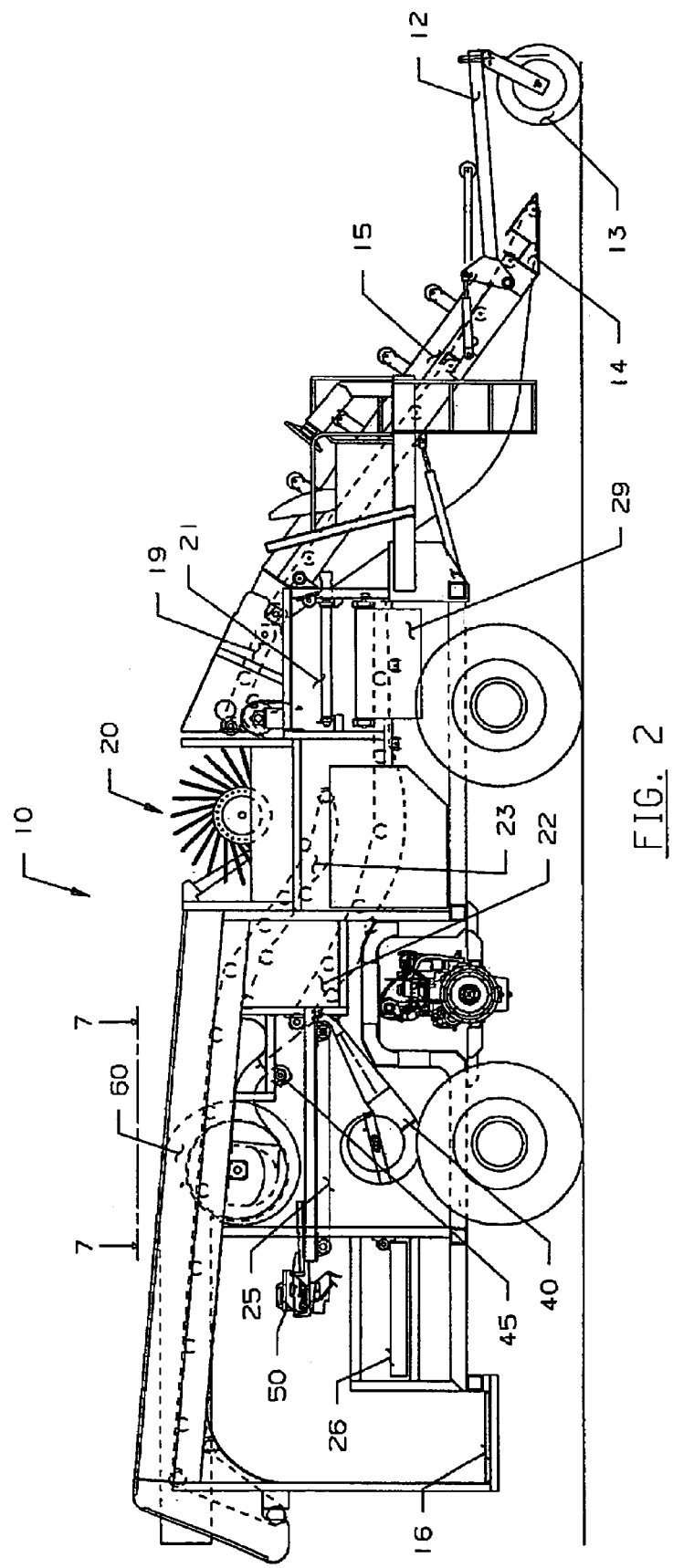
FIG. 2 is a side view of an embodiment of the present invention along line 2-2 of FIG. 1.

Referring to the drawings wherein like reference numerals designate like or corresponding parts throughout the several views, and referring particularly to FIGS. 1 and 2, it is seen that the illustrated exemplary embodiment of the invention is an apparatus and method for harvesting above-ground food plants grown in rows upon elongated planting ridges. The exterior components of the illustrated apparatus generally comprise a self-propelled vehicle body 10 having a driving compartment 11, an adjustable arm 12 with a pickup device 14 and conveyor 15, separator 20, optional sorting platform 16, and a discharging conveyor 17.

Figure 3:
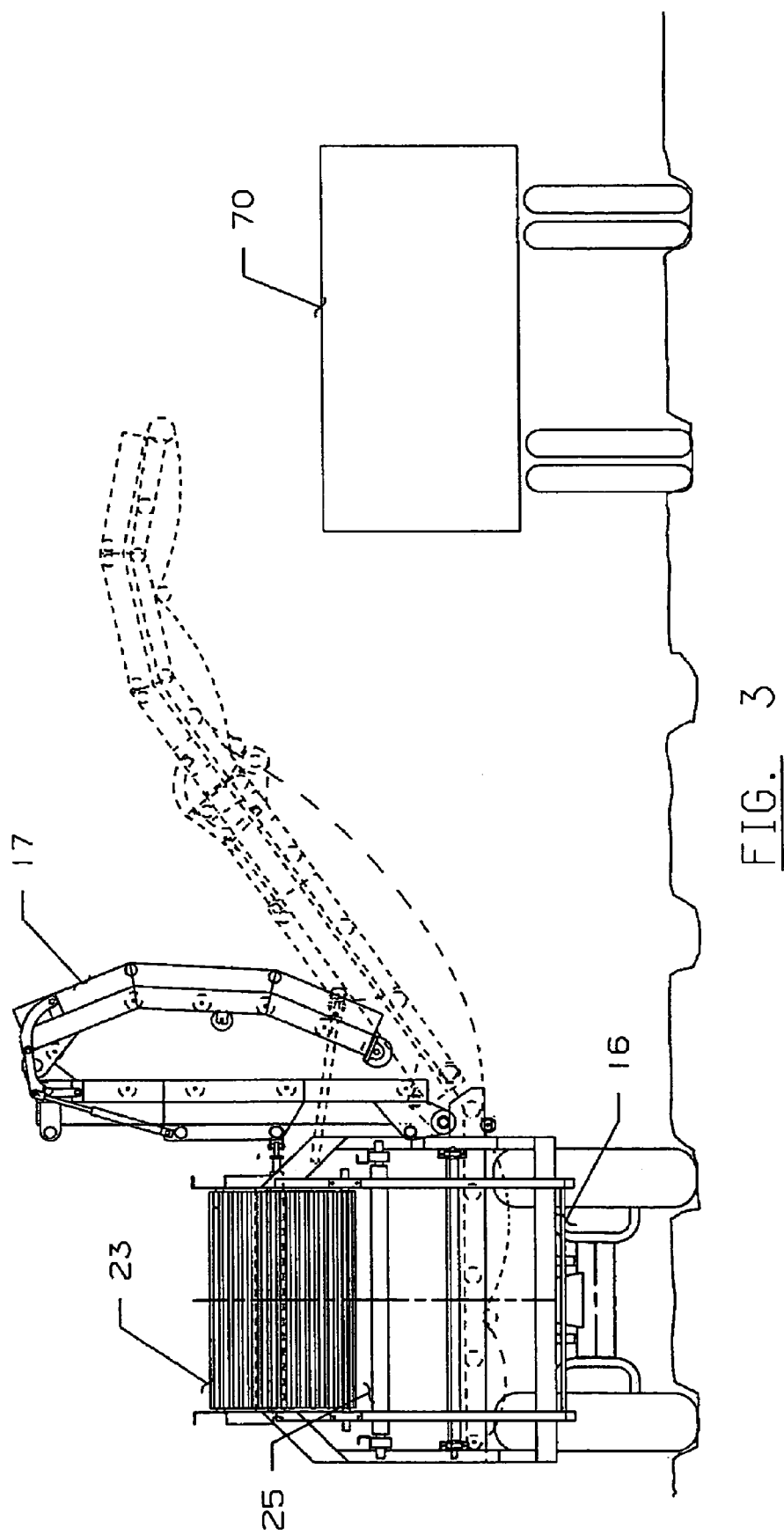
FIG. 3 is a rear view of an embodiment of the present invention along line 3-3 of FIG. 1.

As indicated in FIG. 2, an adjustable arm 12 may be affixed to the front end of the vehicle body 10. The adjustable arm 12 may be any number of commercially available devices that allow the operator to adjust the position of the arm 12 relative to the ground, said position depending upon the characteristics of the particular crop harvested or its environment. A gage wheel 13 for height adjustment may be mounted at the front end of the adjustable arm 12. The pickup device 14 may be any commercially available device capable of severing tomato vines V at or near ground level, such as a cutting disc or plurality of opposing blades, and a lift for placing the severed vines onto conveyor 15. The pickup conveyor 15 may be an endless longitudinal conveyor belt traveling in a rearward direction into the separator 20. Sorting platform 16 may be affixed to the rear end of the vehicle body 10. Platform 16 allows one or more humans to examine and hand sort the tomatoes T on conveyor 26 before they are passed along to a discharging conveyor such as 17. Conveyor 17 is depicted in the rear view of FIG. 3 in its retracted position, with phantom lines showing its extended position over a receiving hopper 70 in an adjacent row.

Figure 4:
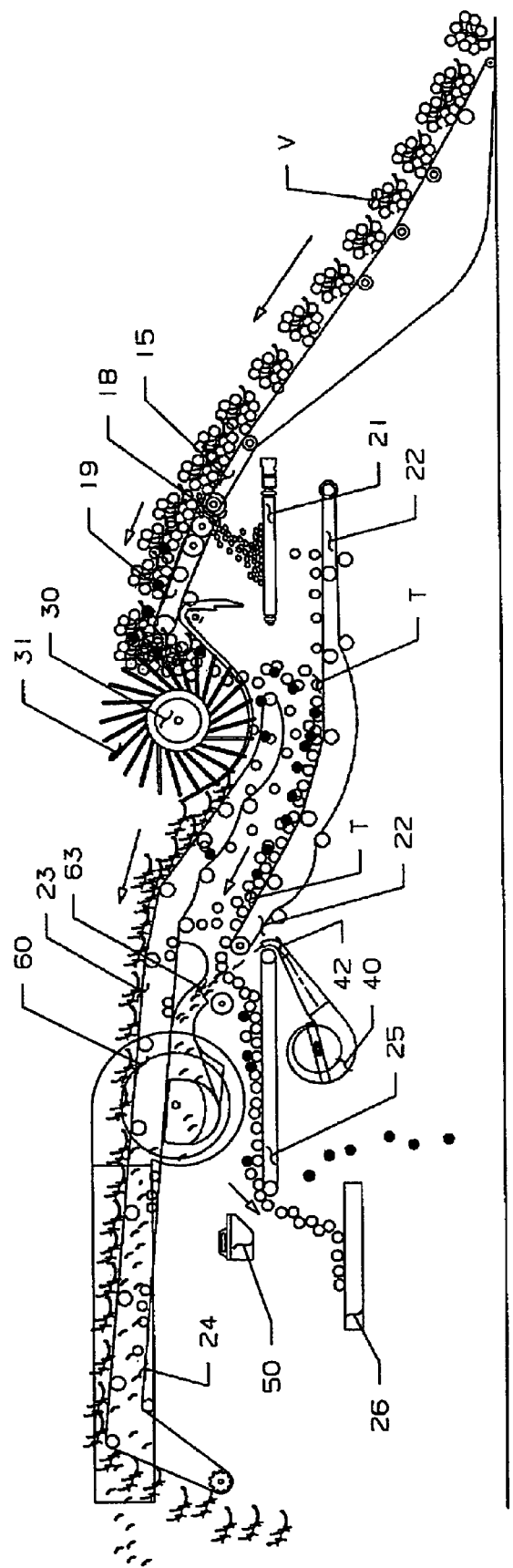
FIG. 4 is a cut away side view along line 4-4 of FIG. 1 illustrating major operative elements of flow paths through the invention.

FIG. 4 depicts the internal operation of one embodiment of the separator 20 of the present invention viewed from the right side. In this embodiment, an endless motor-driven longitudinal receiving conveyor 19 is adapted to receive the tomato vines V from the exterior pickup conveyor 15 and travel toward the rear end of the vehicle body 10. An adjustable gap 18 is provided between the pickup conveyor 15 and receiving conveyor 19, said gap 18 allowing loose tomatoes T, dirt clods and other debris to drop from the vines V while said vines travel between the two conveyors 15 and 19. It is to be appreciated that the width of gap 18 may be varied to account for different sizes of vines V, tomatoes T, dirt clods and debris. For example, gap 18 may be set at a sufficiently small size that only the smaller dirt clods and debris fall through, or at a sufficiently large size that larger objects including small loose tomatoes T may also fall through.

In some embodiments, an endless transversely oriented motor-driven debris conveyor 21, having one end underneath gap 18 and the opposite end extending outside the vehicle body 10, may be positioned to receive the loose tomatoes T, dirt clods and debris falling through gap 18. A commercially available sorting mechanism 27 may be mounted in close proximity to the debris conveyor 21 to recognize loose tomatoes T thereon, and place them onto the endless motor-driven collection conveyor 29 mounted under conveyor 21. The remaining dirt clods and debris fall off conveyor 21 and outside the vehicle body 10. Tomatoes T are collected on 29 and conveyed back up on to the machine and deposited onto an endless motor-driven longitudinal first processing conveyor 22. Alternatively, if gap 18 is set at a sufficient size to allow only dirt clods and debris to fall through, the debris conveyor 21 may transport all objects falling through the gap 18 to the outside of the vehicle body 10.

A shaker brush 30 is positioned for receiving tomatoes and vines from processing conveyor 19. Said shaker brush 30 may be any commercially available brush comprising a plurality of tines 31 and an agitating mechanism (not depicted) for concurrently rotating and vibrating the shaker brush 30, such as an eccentric weight assembly or vibrating motor. It is rotatable along a central axis in a downward direction, causing the vines V to be pulled underneath the shaker brush 30 toward the rear end of the vehicle body 10. The vibratory force of the shaker brush 30 is sufficient to dislodge tomatoes T from their vines V, along with most remaining dirt clods and debris, without excessively damaging the tomatoes T. The dislodged tomatoes T, dirt clods and debris are dropped onto the first processing conveyor 22, while the vines V are deposited upon the recovery conveyor 23.

Processing conveyors 22 and 29 (described below) are made up of segments which provide a plurality of openings or slots that are of sufficient size to support tomatoes T, but allow small pieces of dirt, vegetation and debris to fall through. Larger pieces are removed by blower 40 and suction device 60 described below.

The illustrated exemplary recovery conveyor 23 is an endless motor-driven longitudinal conveyor traveling toward the rear end of vehicle body 10. Conveyor 23 is made up of segments which provide a plurality of openings or slots that are of sufficient size to allow tomatoes to fall through. An agitating mechanism (not depicted) may be provided in communication with the recovery conveyor 23. Said agitating mechanism may be any commercially available device for agitating the tomatoes and vines on the recovery conveyor 23. The agitator should be capable of providing loosening vibratory motions to further separate the tomatoes T that remain entangled but not connected with the vines V at this stage. A recovery shelf track 24 is positioned underneath the return segment of the recovery conveyor 23 to capture the tomatoes T falling through the slots of the recovery conveyor 23, and, in conjunction with the return movement of the recovery conveyor 23, transport the tomatoes T to the first processing conveyor 22.

Figure 9:
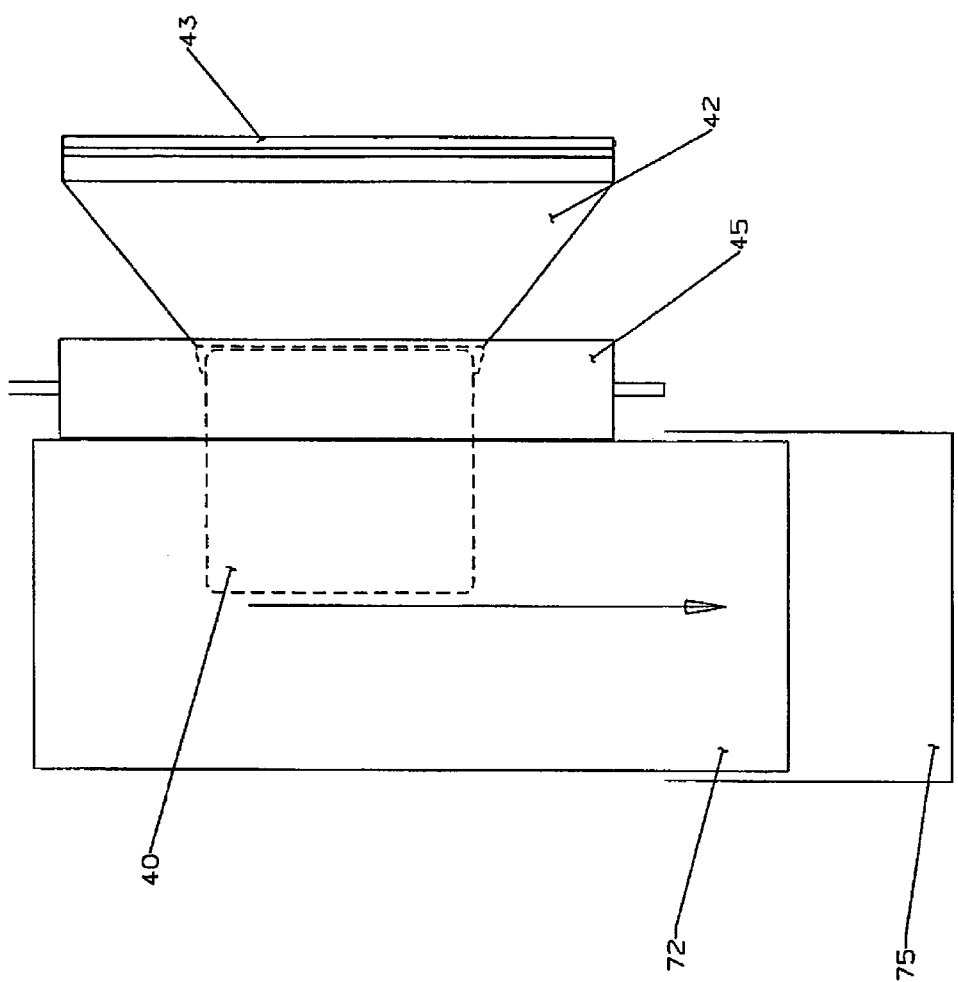
FIG. 9 is a top view of the embodiment of FIG. 16 showing the cleaning elements.

The illustrated exemplary second processing conveyor 25 is an endless motor-driven longitudinal conveyor belt traveling toward the rear end of vehicle body 10. Conveyor 25 is positioned near the rear end of first processing conveyor 22. There is an adjustable gap 28 between the first processing conveyor 22 and the second processing conveyor 25. In some embodiments, an air blower 40 is mounted below the front end of the second processing conveyor 25, with the nozzle 43 directed toward the gap 28 between the two conveyors, so that the forced air pressure emitted from the nozzle 43 contacts the tomatoes T, vegetation, dirt and debris falling from the first processing conveyor 22 onto the second processing conveyor 25. Such forced air pressure may be varied so that it is of sufficient strength to separate vegetation, dirt and debris from the tomatoes T, and force said materials upward and towards the rear without blowing the tomatoes themselves away. In some embodiments, nozzle 43 may be provided with a narrow slit opening 42 to focus the flow of air as shown in FIG. 9. Optional roller(s) 45 may be used to help with the separation of blowing materials by rotating counterclockwise and direct the said materials towards the collection conveyor 72. The vegetation, dirt, and debris may be collected on a transverse conveyor 72 mounted behind roller(s) 45 and directly above conveyor 25. The collected dirt and debris are directed off the side of the machine falling to the ground.

Figure 10:
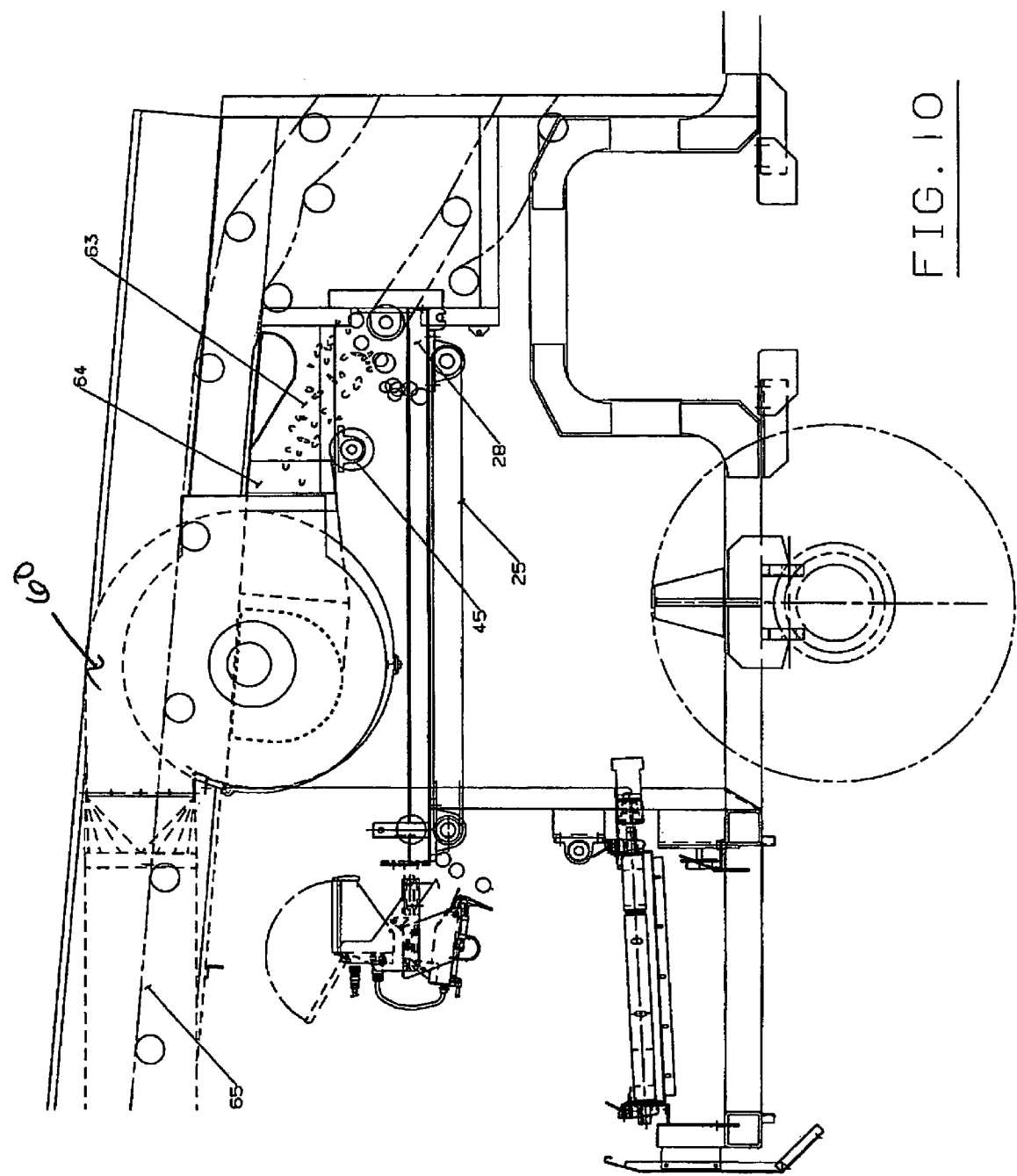
FIG. 10 is a side view along line 10-10 of FIG. 17 of another embodiment of the present invention illustrating overhead suction for cleaning harvested crop.
Figure 11:
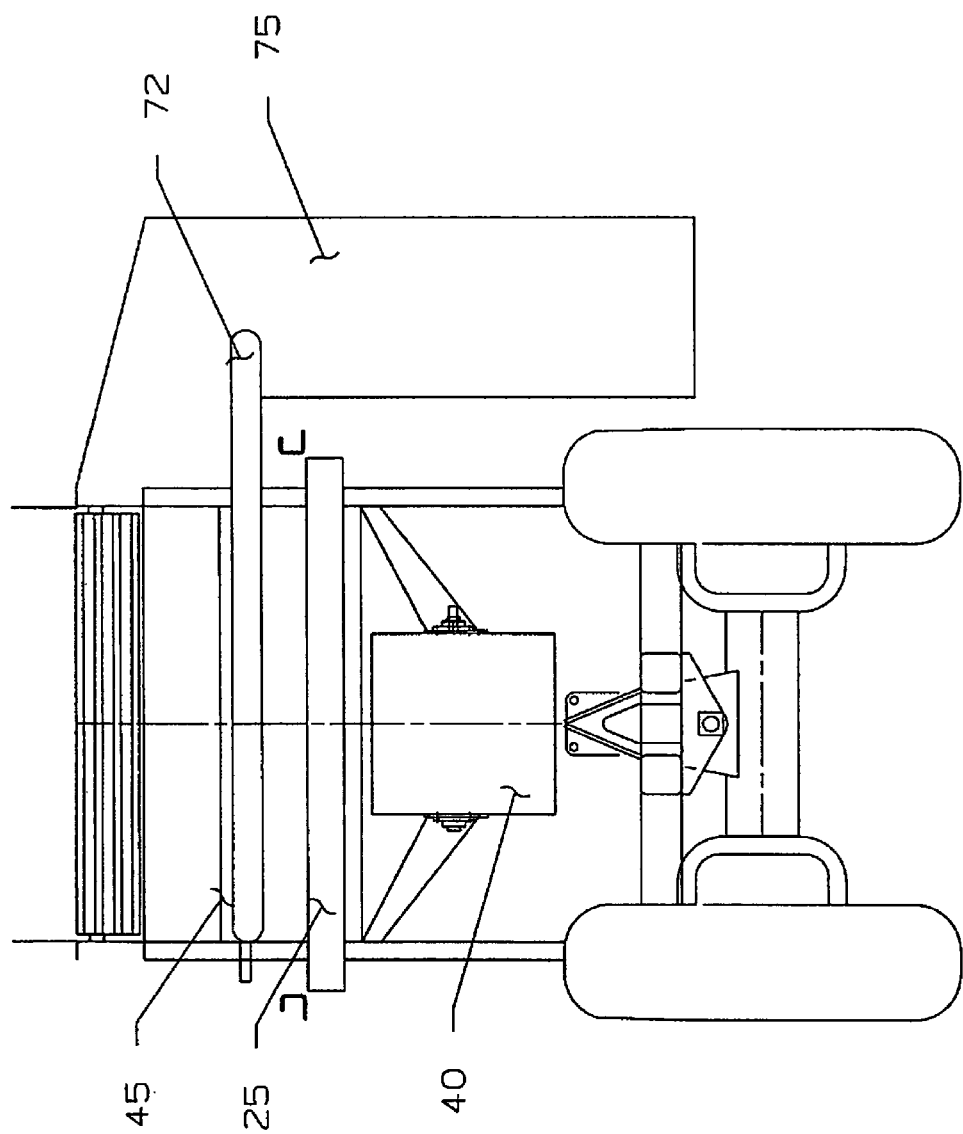
FIG. 11 is an end view along line 11-11 of the embodiment of FIG. 16.

In some embodiments, an air suction device 60, such as a fan or vacuum, is positioned above the gap 28, as shown in FIG. 10. The size and shape of the vacuum opening 63 may be varied, as discussed below, to assure that equal air suction (vacuum) is provided across the entire path (width) of conveyor 22 and gap 28. The vacuum imparted by this suction device 60 may be varied so that it is of sufficient strength to capture the dirt, vegetation and debris.

Figure 12:
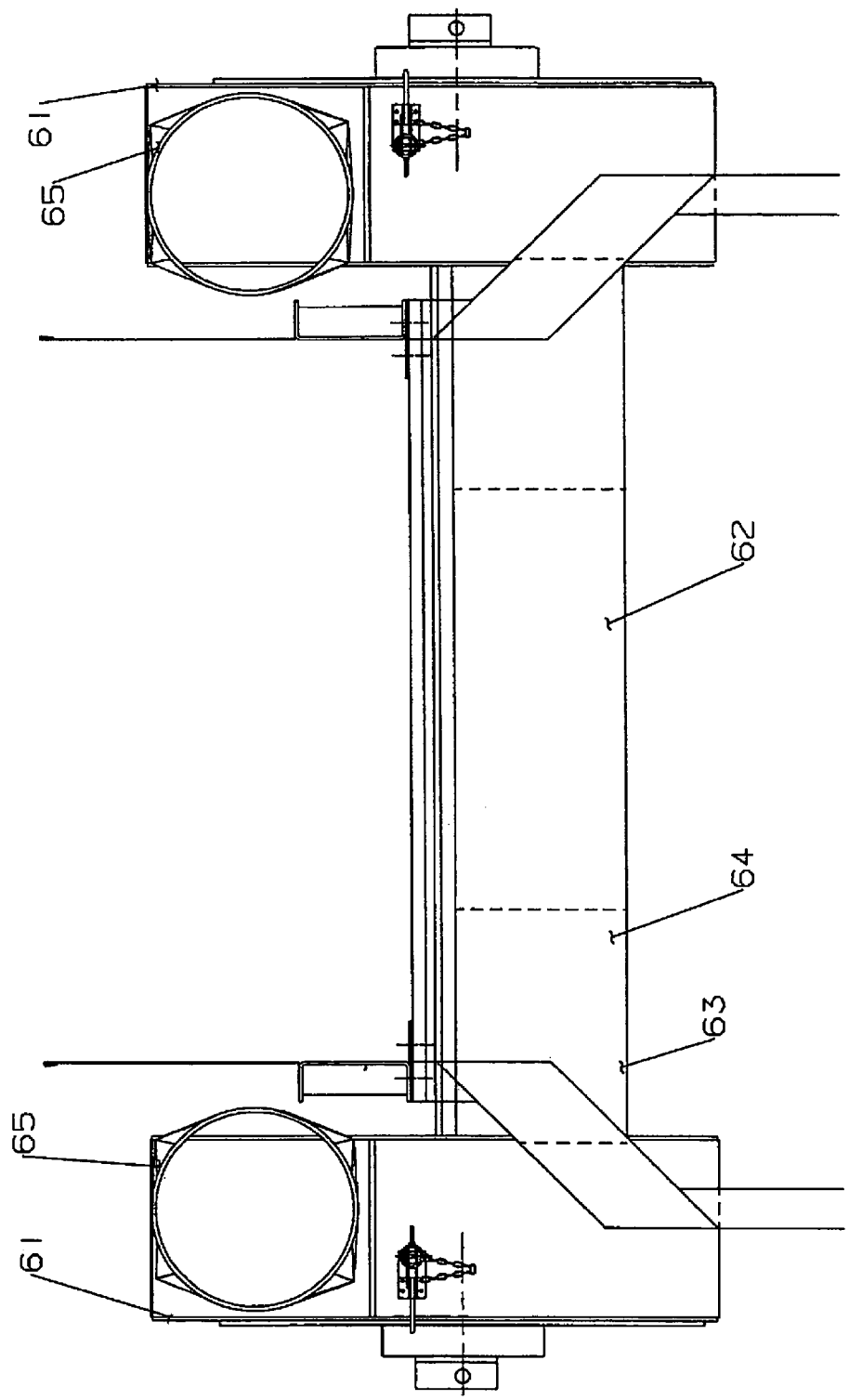
FIG. 12 is a rear view along line 12-12 of FIG. 18 of another embodiment of the present invention illustrating dual suction fans for use in cleaning harvested crop.
Figure 13:
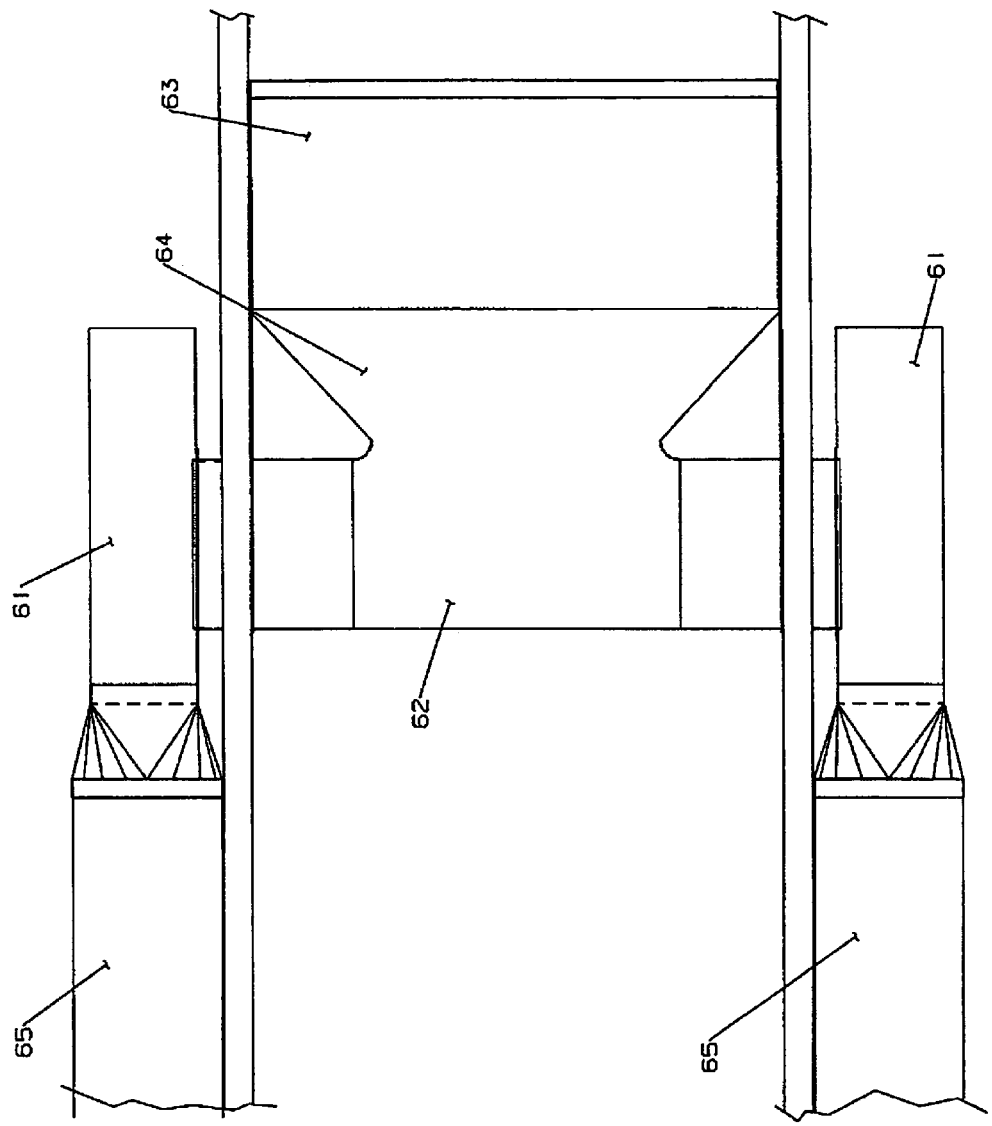
FIG. 13 is a top view of the embodiment of FIG. 18 showing cleaning elements
Figure 18:
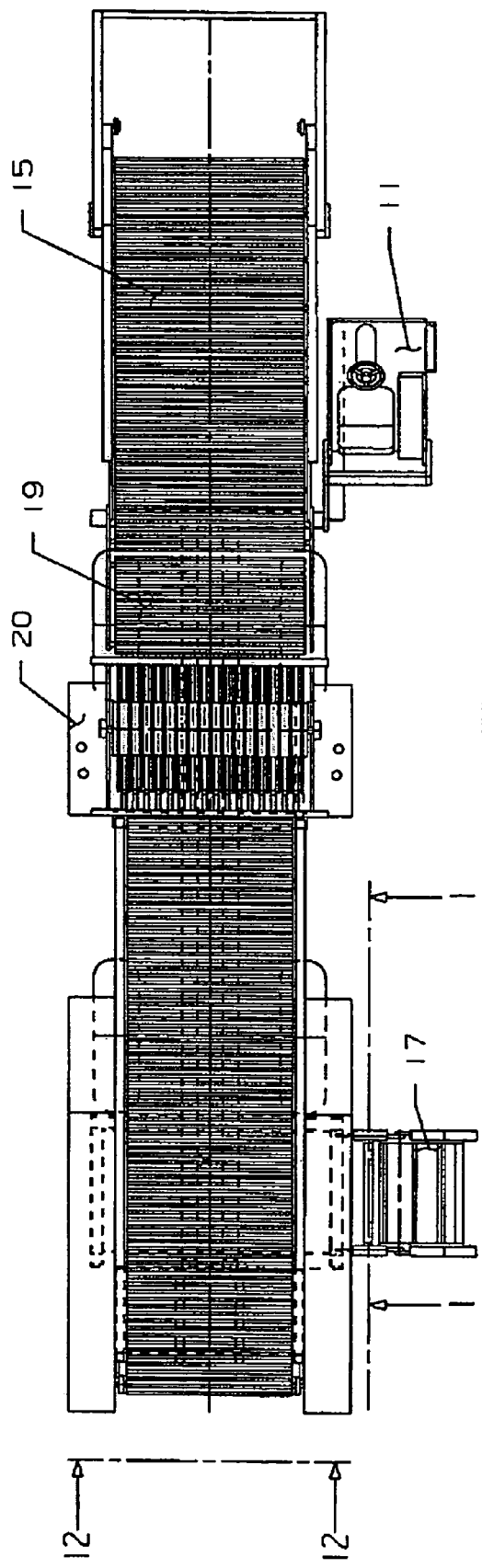
FIG. 18 is a top view of an alternate embodiment of the present invention having dual suction fans.

In one embodiment, the suction fan 60 is positioned vertically on the side, with ducting to connect the pickup nozzle area to the inlet of the fan. (See FIG. 7.) The additional width of the conveyor is an additional challenge for the fan. To overcome this, a larger unit drawing even more power may be used. In alternative embodiments, dual fans 60 may be provided, one on each side of the fruit path, with ducting allowing the entire fruit path to be subject to suction, as shown in FIGS. 12, 13 and 18.

Figure 5:
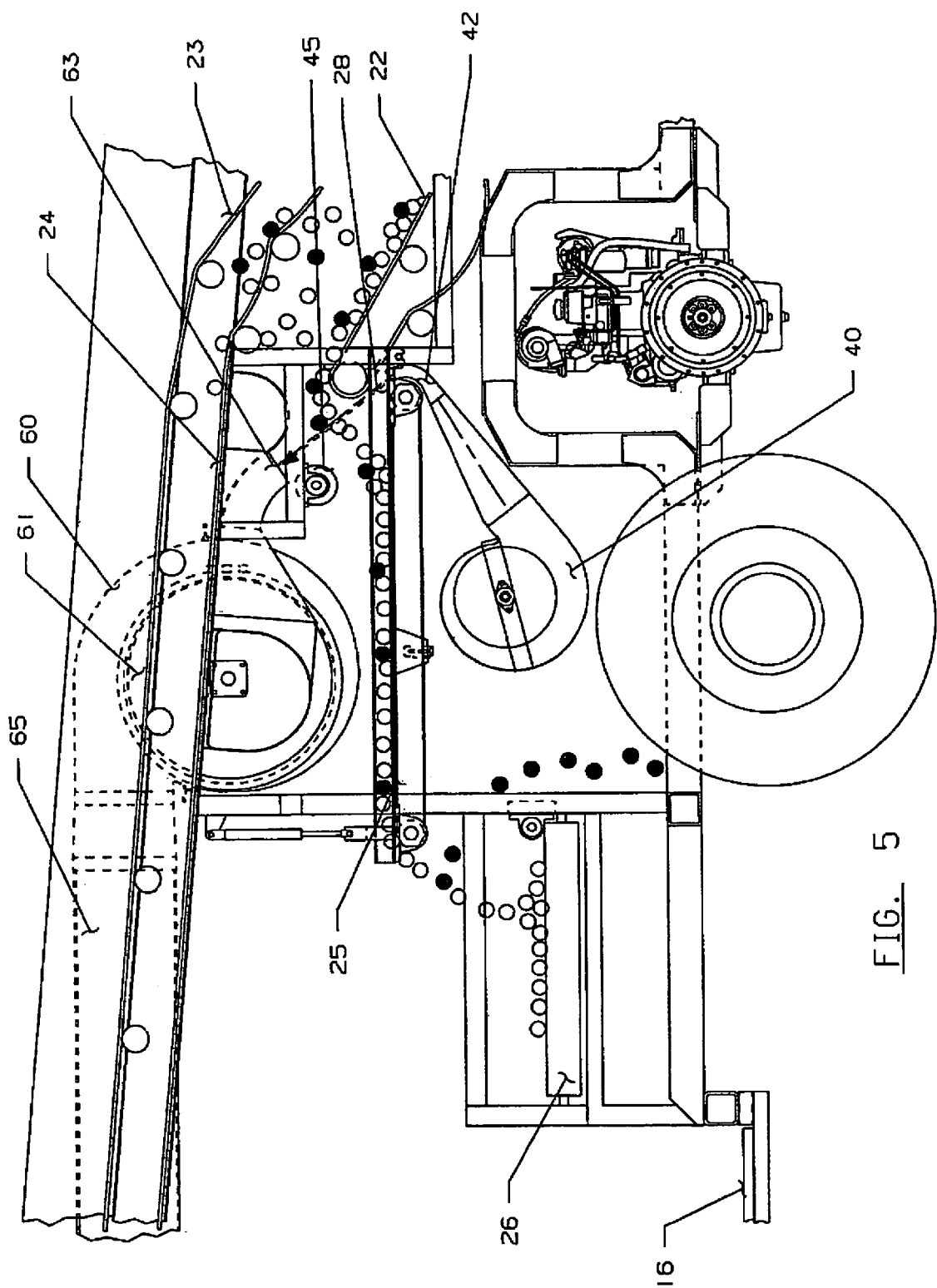
FIG. 5 is a detailed cut away side view along line 5-5 of FIG. 1 of an exemplary air blower and air suction device of an embodiment of the present invention.

FIG. 5 provides a detailed side view of an embodiment using both the air blower 40 and air suction device 60 of the present invention. As shown therein, the nozzle 43 of the air blower 40 is positioned in close proximity to and across the width of gap 28 between the first processing conveyor 22 and second processing conveyer 25, so that the forced air pressure emitted through nozzle 43 contacts the tomatoes T, dirt clods and debris falling from the first conveyor 22 to the second 25. The suction device 60 is positioned above the gap 28 with its opening 63 directly across from the nozzle 43, so that the forced air pressure emitted from the nozzle 43 (and the dirt, vegetation and debris carried by such pressure) is directly received by the opening 63 of the suction device 60. The volume of air provided by the blower and/or suction should generally be adjusted as high as possible without being so strong as to remove the tomatoes themselves.

Figure 17:
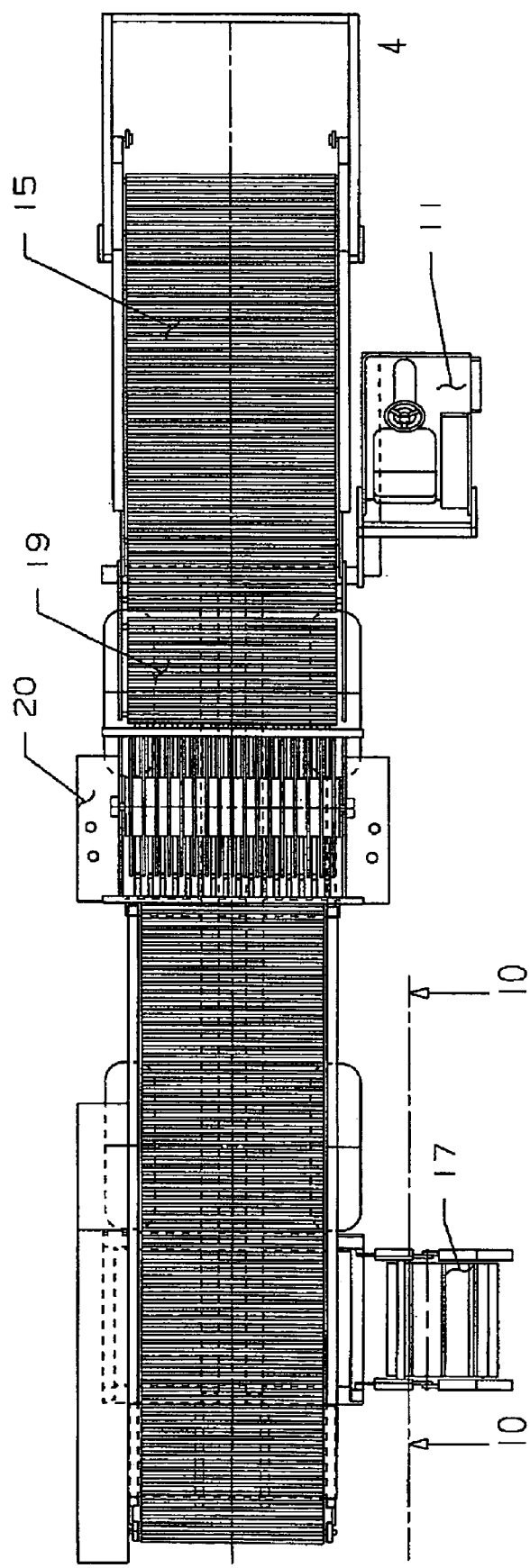
FIG. 17 is a top view of an alternate embodiment of the present invention having a suction fan only.

Blower 40 also provides the additional function of dislodging vegetation or debris that may have become adhered to conveyor 22 through moisture or the like, thereby improving the efficiency and operational functionality of conveyor 22. It is to be appreciated that in other embodiments, blower 40 may be provided without suction 60 (see FIGS. 8, 9, 11 and 16), and in other embodiments suction 60 may be provided without blower 40 (see FIGS. 10 and 17).

In some embodiments, at least one roller 45 is provided. Roller(s) 45 may be provided adjacent to and below the opening 63 of suction device 60 (FIG. 5), or above the nozzle 43 of the blower device (FIG. 9), and extending across the width of opening 63 or nozzle 43. Roller(s) 45 may have a smooth surface, or may be provided with teeth, lagging or tines of appropriate length to engage the vegetation and other dislodged debris. In the suction embodiments of the present invention, roller(s) 45 rotate while the suction device 60 is operating so as to make contact with and dislodge any excessive vegetation or other debris in order to prevent opening 63 from being clogged. As shown in FIG. 5, roller(s) 45 may be rotated in a clockwise direction so as to continuously be causing vegetation and debris to be pushed out and away from opening 63. However, this may cause such vegetation and debris to be deposited with the relatively clean tomatoes T on conveyor 25. Thus, in many circumstances, it may be more beneficial for one or more of rollers 45 to rotate counterclockwise so as to force the vegetation and debris into opening 63 so that it may be carried away. Among other things, the size and moisture content of the vegetation and debris may dictate whether roller(s) 45 operate in a clockwise or counterclockwise direction, or some rollers in one direction and others in the opposite direction.

Figure 8:
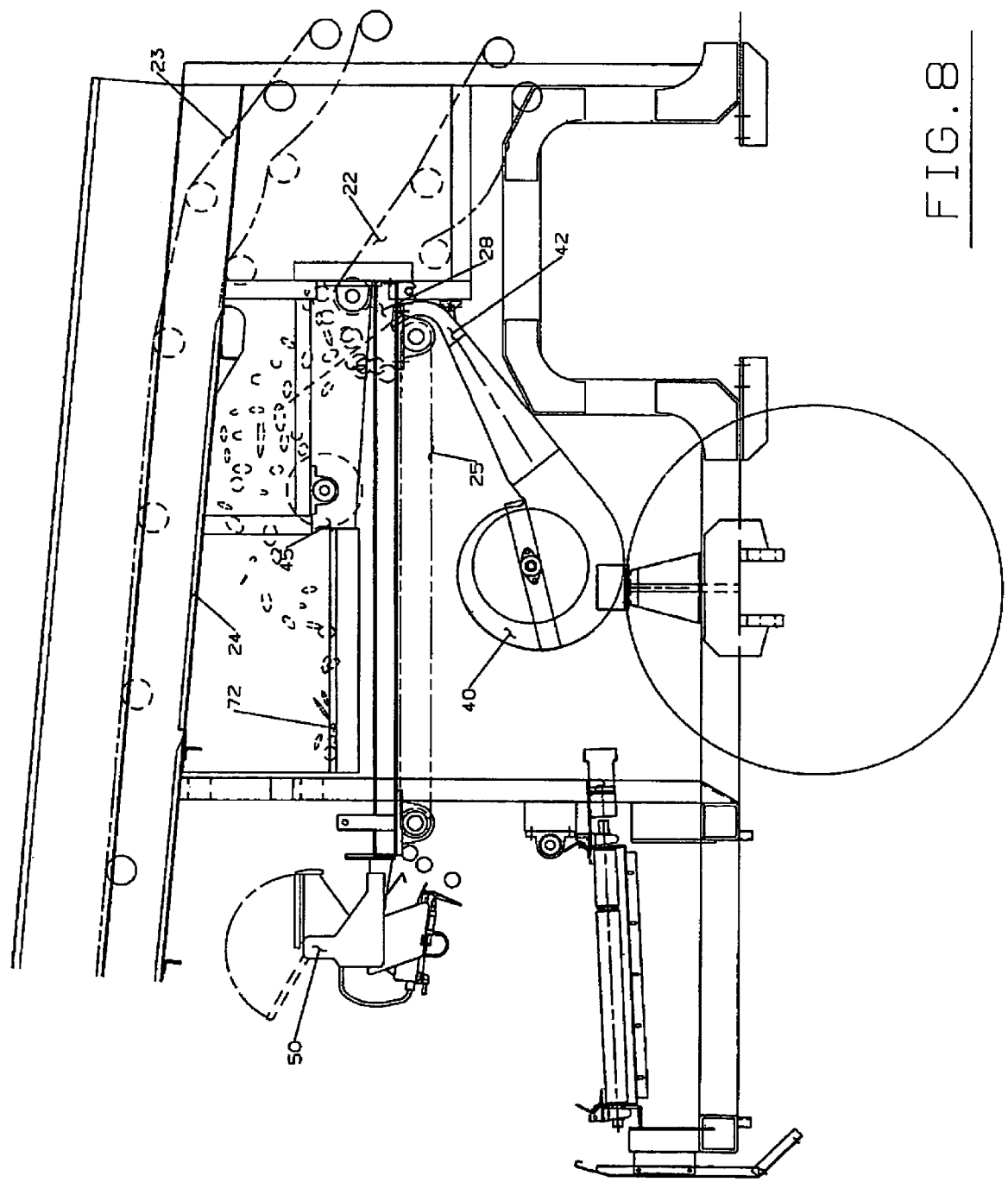
FIG. 8 is a side view along line 8-8 of FIG. 16 of another embodiment of the present invention illustrating a blower for cleaning harvested crop.

FIGS. 8 and 9 illustrate an embodiment of a blower used on the small scale machine. On the side view of FIG. 8, a blower outlet 43 is positioned to direct air upward through the gap 28 between two conveyors 22 and 25. The air goes through the fruit stream, lifting the lighter trash upward into the air chamber and over optional roller(s) 45. In this embodiment, roller(s) 45 help deliver debris onto a cross conveyor 72 where it may be transferred into an optional removal chute 75. On the backside of the roller 45, the air is allowed to vent out one side in a larger cavity with a conveyor underneath. Part of the trash in the air settles out and is conveyed to the side of the machine with the conveyor 72. The lighter trash will likely stay airborne and vent out with the air to the side. In some embodiments, the air may be vented off both sides, with the conveyor split to run both directions. In another embodiment, air may also be allowed to vent towards the rear of the machine through a screen. In this embodiment, when the system stops at the end of the field, the air-stream would stop, and the loose trash collected on this screen would fall down to the conveyor.

In some embodiments, accommodation for trash collection and directing material to the ground with a flexible chute 75 (see FIG. 11) made with flaps may be needed to prevent light trash from collecting in the wrong places and causing engine or hydraulic overheating. The trash conveyor 72 is preferably a flat belt, not a belted chain. On FIG. 8, the sides of the air chamber are enclosed to direct the trash over roller 45 to the collection conveyor. The underside of the recovery shelf track 24 serves as the top of the air chamber.

Figure 7:
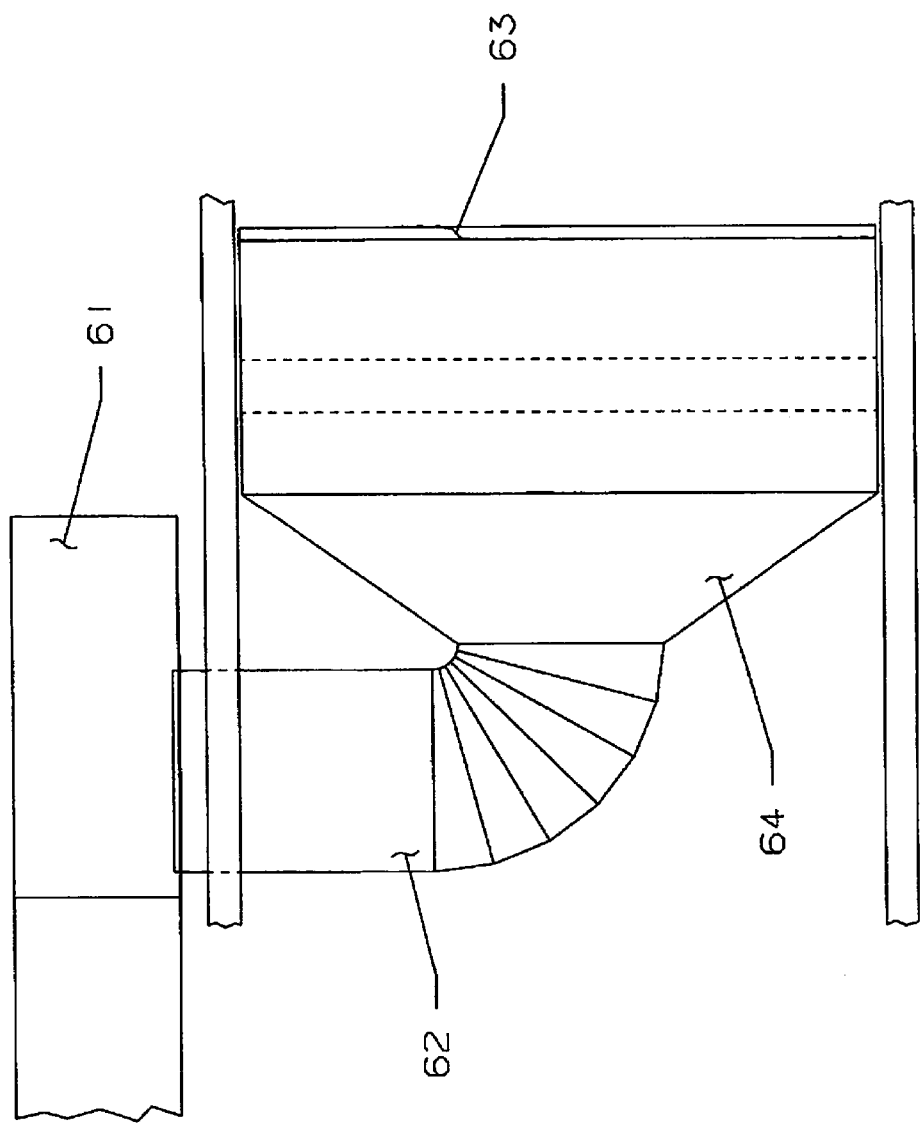
FIG. 7 is a top view of a suction device of an embodiment of the present invention along line 7-7 of FIG. 2.

A side view of a suction device 60 is shown in FIG. 5, and a top view is shown in FIG. 7. In this illustrated embodiment, suction device 60 includes a variable speed fan or blower unit 61 attached to a channel 62 that is attached, in turn, to a duct 64 leading to opening 63. An exhaust duct 65 may also be provided. Because of the change in direction of airflow through channel 62 and duct 64, the size and shape of opening 63 may be varied so as to provide a uniform level of suction across the entire path of conveyor 25 and gap 28. By way of example and without limitation, opening 63 may not be provided in a rectangular form, but the left side of opening 63 may be narrower than the right side so as to assure level airflow across its length.

Figure 14:
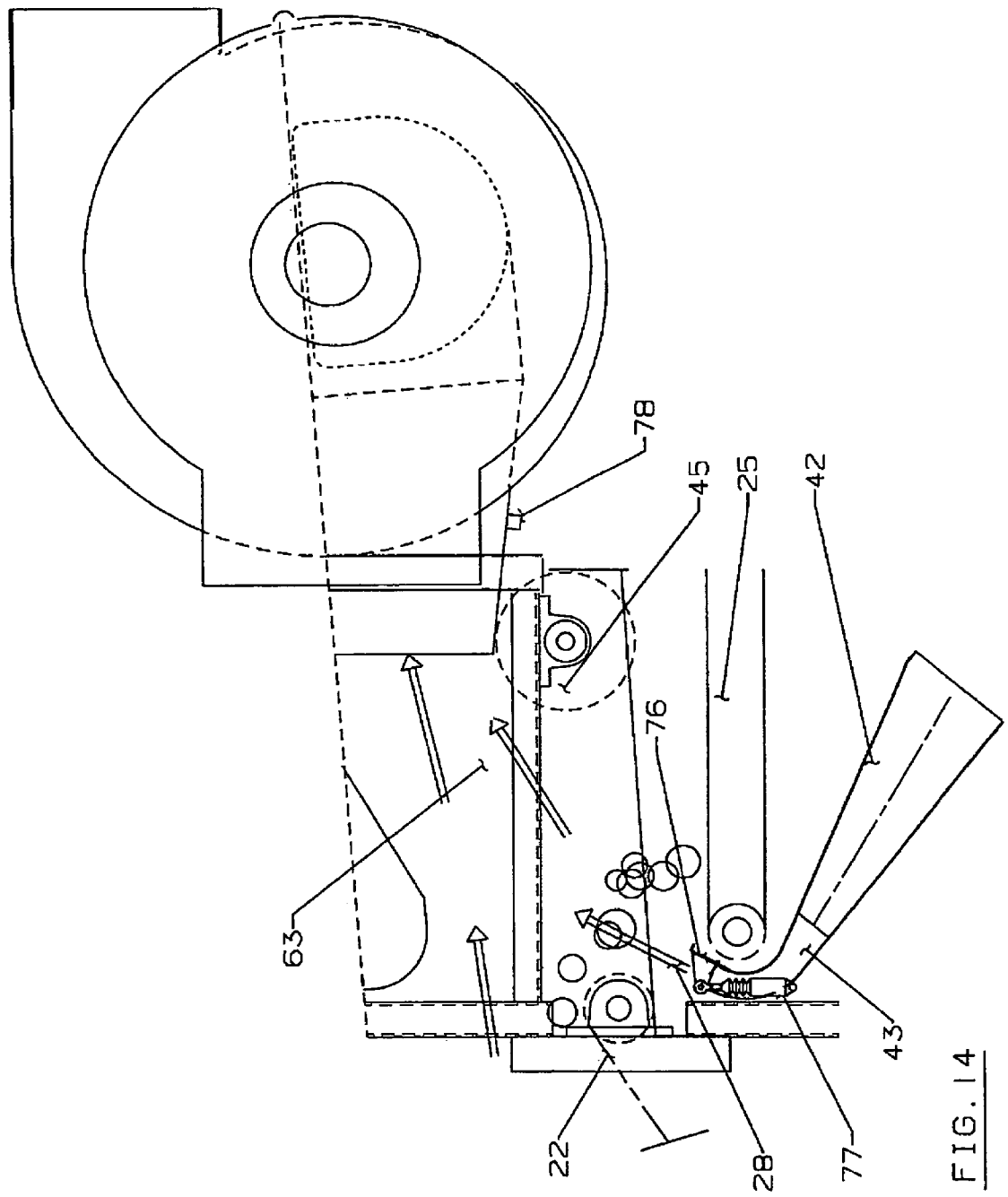
FIG. 14 is a side view of an alternative embodiment of the present invention showing the blower and suction fan system operating under normal conditions.
Figure 15:
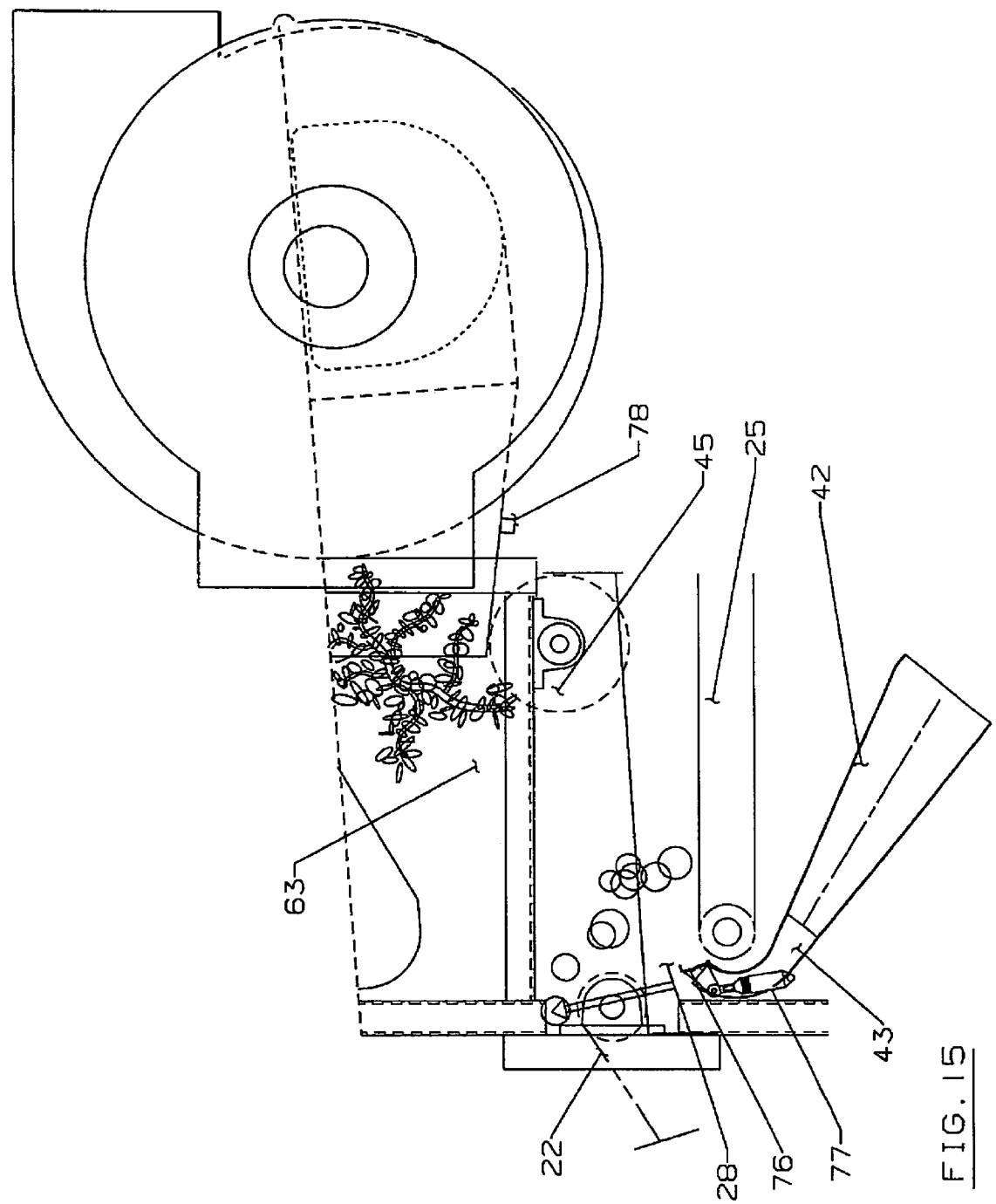
FIG. 15 is a side view of the embodiment of FIG. 14 showing the blower and suction fan under a plugged/clogged state with the blower flap directing air forward in the machine.
Figure 16:
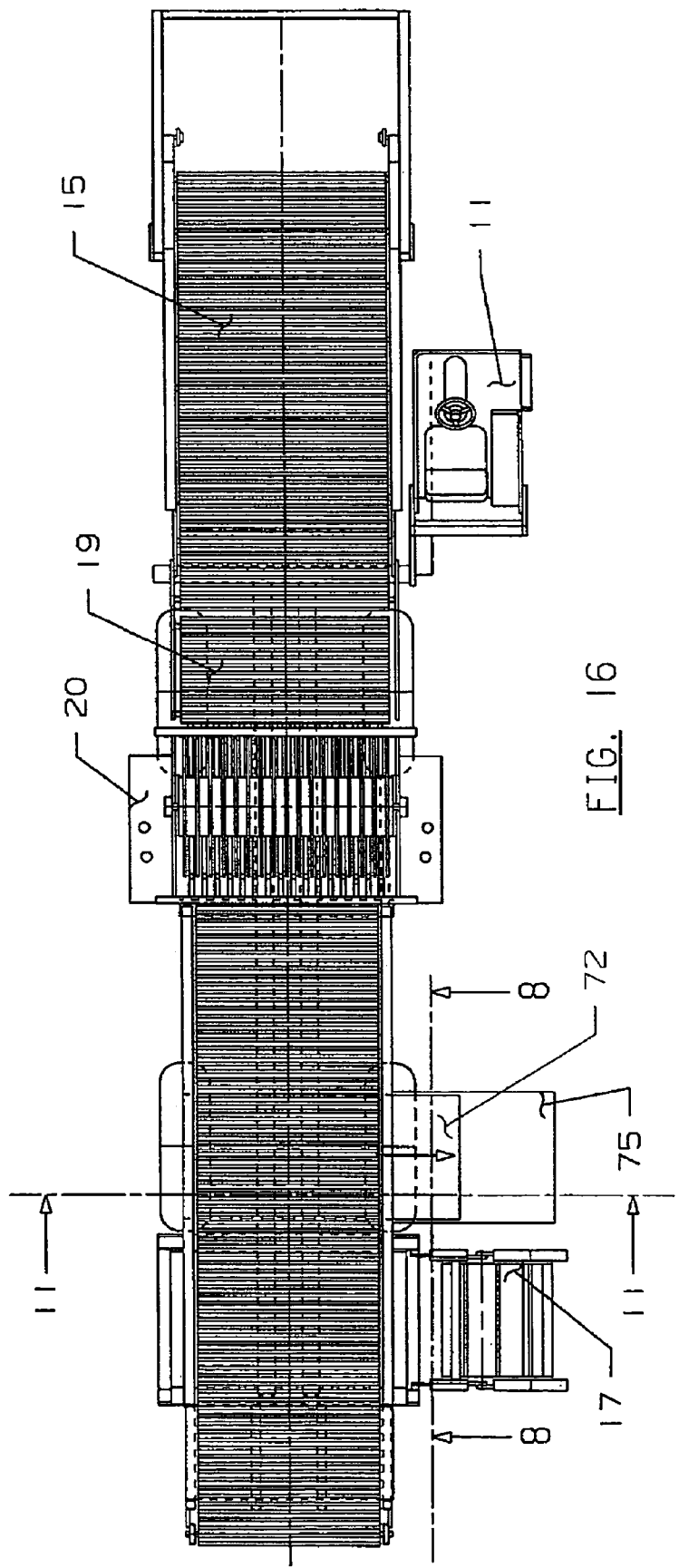
FIG. 16 is a top view of an alternate embodiment of the present invention having a blower only.

In an alternative to the embodiments using both suction 60 and blower 40, one or more flaps 76 may be provided on the blower outlet nozzle 43 which may be opened or closed to respond to clogging of the suction system by a large clump of vine mass. See FIGS. 14 and 15. Such a clog causes the suction 60 to lose some of its airflow, and when used with blower 40, may result in undesirable redirecting of blower air flow blowing trash where it is not wanted. The flap 76 is attached to one or more electronically controlled solenoids or other switches 77, and a sensor 78 such as a static air pressure sensor is provided adjacent to the suction unit. If the sensor 78 detects a change in air pressure brought about by a clog caused by a large vine mass (FIG. 15), the switches 77 are activated closing the flap 76 so as to redirect the air from the suction system forward in the machine into conveyor 22, until the clog has cleared. See upward arrow of FIG. 15. The clearing of the clog is sensed by the pressure returning to normal, at which point the switches 77 are deactivated returning the flaps to their normal operating positions, as shown in FIG. 14.

FIGS. 12, 13 and 18 illustrate an alternative embodiment using a dual suction fan arrangement. The top view of FIG. 13 shows ducting to both sides of the machine with no dividing partition inside the ductwork. Air is allowed to flow freely through with no catch point for trash to hook on. A very large volume of air can be moved with this embodiment without needing the additional space required for a single overly sized unit. The horsepower required to drive this embodiment is significant, but all the trash collected may be controlled.

It is to be appreciated that all of conveyors 15, 19, 22, 23 and 25 are provided along the same vertical plane, and are operatively positioned, as described herein, above and/or below each other in this plane. In this way, the tomatoes T removed from the vines travel along a straight path, moving from, the front toward the rear of the machine, being directed by the conveyors and by gravity. This configuration avoids any left or right turns in the path that the tomatoes T travel through the machine, resulting in better distribution of the tomatoes across conveyor 25 when they reach the sorting stage. Left and right turns in the paths of other machine cause the tomatoes to roll together into windrows that are more difficult to separate and sort.

In some embodiments, an endless motor-driven transversely oriented output conveyor 26 may be positioned near the rear end of the second processing conveyor 25. A gap is provided between the second processing conveyor 25 and the output conveyor 26. An optical/mechanical fruit sorter 50 is mounted in close proximity to this gap. The optical/mechanical fruit sorter 50 may be any commercially device capable of selecting or rejecting tomatoes T based upon certain predetermined criteria, such as color. It should also comprise a means of sorting tomatoes T based upon their satisfaction of the predetermined criteria, such as a mechanical arm or pivoting gates. It is to be understood that the mechanical fruit sorter 50 may be replaced by, or supplemented with, human sorters who can manually examine the tomatoes on conveyor 26 as they stand on platform 16.

Regardless of the particular examination method utilized, tomatoes T satisfying the predetermined criteria are transported to output conveyor 26, while rejected tomatoes are removed therefrom, either by the mechanical sorter 50 or human sorters. The output conveyor 26 is in communication with the discharging conveyor 17, which transports the satisfactory tomatoes from the present invention onto any number of commercially available hoppers, such as a trailer or truck bed 70.

Figure 6:
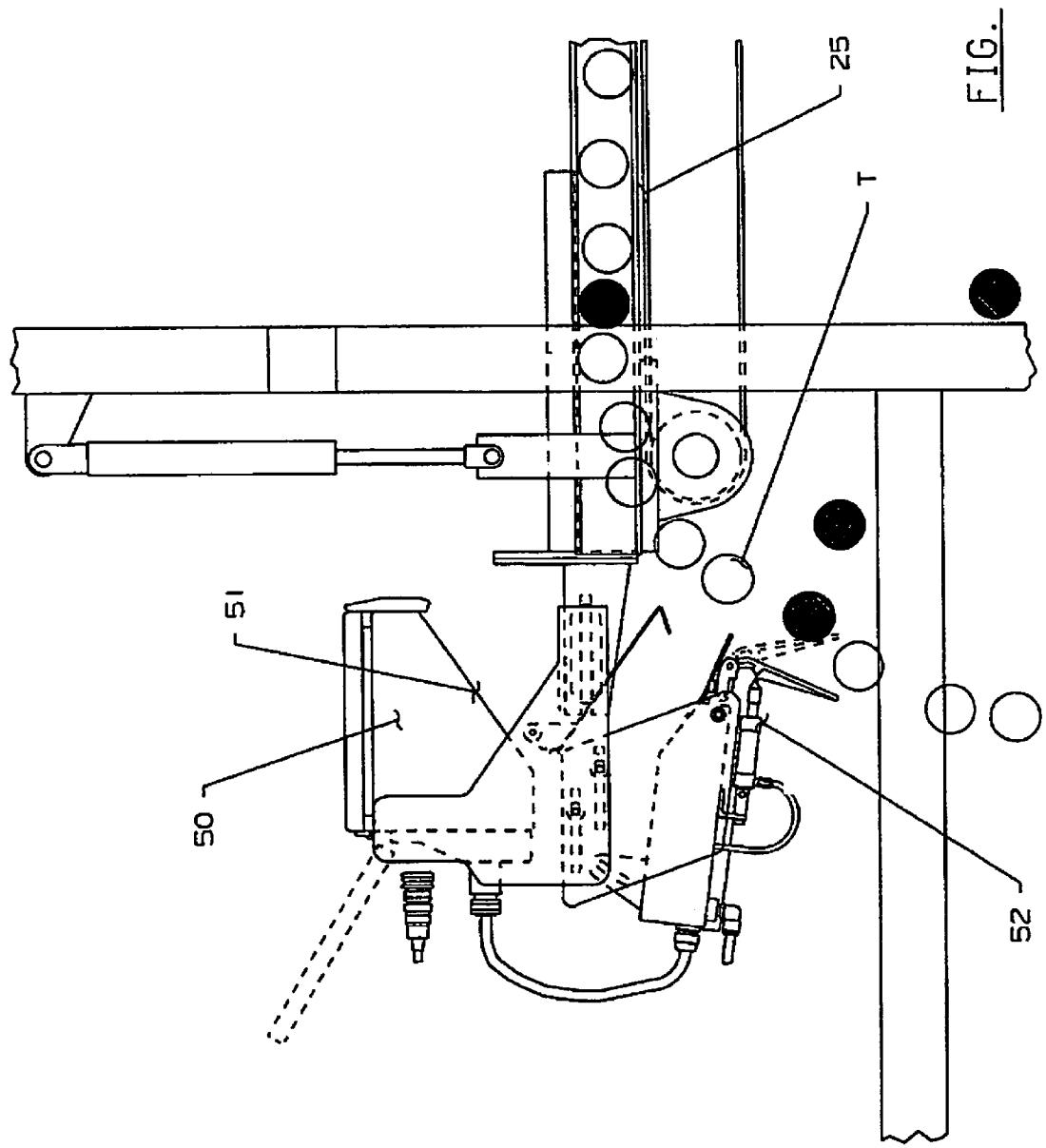
FIG. 6 is a side view along line 6-6 of FIG. 1 of an exemplary mechanical fruit sorter of an embodiment of the present invention.

FIG. 6 depicts an embodiment utilizing a mechanical fruit sorter 50 located along the same vertical plane. It is seen that the mechanical fruit sorter 50 comprises a sensor 51 and pivoting gate 52. The sensor 51 may be any commercially available device capable of determining whether the tomato T satisfies the predetermined criteria inputted by the operator. Tomatoes T satisfying such criteria are permitted to fall toward output conveyor 26. As to tomatoes $T_1$ failing such criteria, the fruit sorter 50 causes the gate 52 to pivot outward, causing the failing tomatoes $T_1$ to miss the output conveyor 26 and fall outside the vehicle body 10.

The use of a particular embodiment of the present invention will now be described without limiting the claims herein. In this exemplary embodiment, the operator inputs a series of predetermined criteria into the mechanical fruit sorter 50, which defines the parameters for the 'acceptable' tomatoes harvested. The size of gap 18 is selected and set. The initial airflow for blower 40 and/or suction 60 is also selected (depending upon whether one or both is provided), although these may be changed during processing to provide appropriate removal of debris. The exemplary invention is then positioned before a row of tomato vines V. The adjustable arm 12 is placed in such a manner that the cutting device 14 will sever the tomato vines V at or near ground level. As the present invention proceeds along the row of tomato vines V, cutting device 14 severs the tomato vines V. The pickup mechanism receives the severed tomato vines V (along with loose tomatoes T, dirt clods and debris), and places them onto the pickup conveyor 15. The pickup conveyor 15 then transports the vines V rearward into separator 20.

The tomato vines V are transported over the gap 18 between the pickup conveyor 15 and receiving conveyor 19. As they cross the gap, loose tomatoes T, dirt clods and debris smaller than the width of the gap fall through, and onto the debris conveyor 21. The debris conveyor 21 passes the mixture through a sorting mechanism. Tomatoes T within the mixture are diverted to the collection conveyor 29, then dropped onto the first processing conveyor 22, while the dirt clods and debris passing through the sorting mechanism are discarded outside the vehicle body 10.

The tomato vines V upon the receiving conveyor 19 travel along a vertical plane and contact the shaker brush 30. As the downward rotation of the shaker brush 30 pulls the tomato vines V underneath the brush, the vibration of the brush tines 31 dislodges the tomatoes T from the vines V, along with the remaining dirt clods and debris. The dislodged tomatoes T, dirt clods and debris fall onto the first processing conveyor 22, while the vines V (along with any tomatoes T still lodged therein) are deposited by the shaker brush 30 upon the recovery conveyor 23.

As the recovery conveyor 23 transports the vines V along the vertical plane toward the rear of the vehicle body 10, it is vibrated by an agitating mechanism. The vibrating motion of said mechanism is sufficient to dislodge the remaining tomatoes T from the vines V. These tomatoes T fall through the slots of the recovery conveyor 23 onto the recovery shelf track 24. The vines continue rearward until they are ejected from the rear end of the vehicle body 10. The return direction of the recovery conveyor 23 receives the tomatoes T and deposits them upon the first processing conveyor 22, along with the tomatoes T dislodged by the shaker brush 30.

The first processing conveyor 22 continues to transport the tomatoes T (and remaining dirt clods and debris) toward the rear end of the vehicle body 10 along the vertical plane. When the mixture reaches the rear end of the first processing conveyor 22, it falls to the second processing conveyor 25 along the plane. During the fall, the mixture is struck by air pressure from the air blower 40 (if provided) mounted underneath the second processing conveyor 25. The air should be of sufficient volume to cause the tomatoes to "dance," that is, to be moved slightly so that the debris and vegetation around them is removed, while the tomatoes themselves are not. Such air pressure causes the dirt and debris to separate from the tomatoes T and fly upward, where they are captured by suction pressure from the air suction device 60 (if provided). The suction device 60 ejects the dirt clods and debris from the rear end of the vehicle body 10, while the tomatoes T continue along the second processing conveyor 25.

As the tomatoes T reach the rear end of the second processing conveyor 25, they are analyzed by a mechanical fruit sorter 50 along the vertical plane. Tomatoes T satisfying the particular criteria previously inputted by the operator are transported onto output conveyor 26, while unacceptable tomatoes are discarded out the bottom of the vehicle body 10. The output conveyor 26 transports the acceptable tomatoes T past manual sorters standing on platform 16, and then to the discharging conveyor 17, where the tomatoes T are placed into transport hoppers 70.

It is to be understood that variations and modifications of the present invention may be made without departing from the scope thereof, including different combinations of the various elements identified herein regardless of whether such combinations have been specifically described or illustrated. It is also to be understood that the present invention is not to be limited by the specific embodiments disclosed herein, but only in accordance with the appended claims when read in light of the foregoing specification.

What is claimed is:

1. A machine for harvesting vine-borne crops along a path on a vertical plane extending from front to rear inside the machine comprising:

a. a self-propelled harvester main frame;
    b. at least one feeder conveyor traveling along said vertical plane for transporting severed vines with crops rearward along said path to a shaker brush in said machine;
    c. a recovery conveyor traveling along said vertical plane of said machine adjacent to said shaker brush for conveying shaken vines away from the shaker brush along said vertical plane toward the back of the machine;
    d. a removal conveyor traveling along said vertical plane having a portion thereof located below the shaker brush for collecting dislodged crops from the shaker and conveying them rearward along said path, said removal conveyor terminating inside said machine;
    e. a crop return deployed underneath said recovery conveyor and traveling along said vertical plane for bringing additional crops that have been dislodged from the vines forward along said plane to the removal conveyor;
    f. a sorter conveyor traveling along said vertical plane for conveying dislodged crops rearward along said path, wherein one end of said sorter conveyor is adjacent to the termination of said removal conveyor defining a gap therebetween, said gap extending across said path; and
    g. an air blower having a nozzle located along said vertical plane below said gap for separating unwanted materials from said dislodged crops.

2. The machine of claim 1 wherein said blower nozzle is in the form of a narrow slit extending across the width said removal conveyor.

3. The machine of claim 1 wherein the blower provides air at speeds that are adjustable.

4. The machine of claim 1 further comprising a discharge conveyor oriented perpendicularly to said sorter conveyor, and a platform provided along said discharge conveyor for supporting human sorters.

5. The machine of claim 1 further comprising an air suction unit having an input opening located along said vertical plane above said nozzle for receiving said unwanted materials.

6. The machine of claim 5 wherein at least one rotatable roller is provided adjacent to said upper air suction unit to prevent clogging thereof.

7. The machine of claim 5 wherein said blower nozzle further comprises a movable flap, and wherein a sensor is provided for detecting a clog in said suction unit and communicating a signal to activate said flap in the event of such a clog.

8. The machine of claim 1 wherein a second feeder conveyor is provided that travels along said vertical plane between the first feeder conveyor and the shaker defining an adjustable second gap between said feeder conveyors through which materials may drop.

9. The machine of claim 8 wherein a debris conveyor is provided underneath said second gap for conveying materials falling through said second gap away from the machine.

10. The machine of claim 1 wherein an air chamber is provided for directing away unwanted materials separated by said blower.

11. The machine of claim 1 wherein an upper air suction unit is provided along said vertical plane at an end of said removal conveyor above said blower nozzle.

12. The machine of claim 11 wherein at least one rotatable roller is provided adjacent to said upper air suction unit for dislodging unwanted materials from said crop.

13. The machine of claim 1 further comprising a cross conveyor located above said sorter conveyor for directing said unwanted materials away from said machine.

14. A method for harvesting vine-borne crops along a path on a vertical plane extending generally down the middle from front to rear inside a machine comprising the steps of:
   a. severing crop-laden vines from the earth;
   b. conveying said crop-laden vines upward and rearward along said vertical plane and depositing them into a shaker;
   c. shaking said crop-laden vines to dislodge at least some of the crop therefrom;
   d. conveying said shaken vines rearward away from said shaker along said plane;
   e. collecting and conveying said dislodged crop rearward along said plane away from said shaker;
   f. directing said shaken vines rearward to a recovery conveyor traveling along said plane for separation of additional crop from said vines;
   g. retrieving said additional crop from the recovery conveyor and directing it forward along said plane for further processing;
   h. passing said dislodged crop across an upwardly directed adjustable high volume of air located along said plane to separate unwanted materials from said crop; and
   i. conveying said separated crop along said plane rearward away from said volume of air.

15. The method of claim 14 comprising the additional steps of:
   i. conveying said crop-laden vines rearward over a gap along said plane before depositing them into said shaker such that some materials fall through said gap; and
   j. expelling said fallen materials to the exterior of said machine.

16. The method of claim 14 comprising the additional steps of:
   i. diverting said unwanted materials onto a transverse conveyor; and
   j. directing said materials to a side of the machine.

17. A method for recovering above-ground vine-borne food along a path on a vertical plane extending generally down the middle from front to rear inside a machine, comprising the steps of:
   a. collecting entangled food and vines onto a main frame;
   b. directing the entangled food and vines rearward along said vertical plane to a shaker brush having a plurality of tines;
   c. inducing a shaking action in the vines, causing a separation of at least some of the food from the vines;
   d. retrieving dislodged food fallen from the shaker brush with a food conveyor traveling rearward along said vertical plane below the shaker brush;
   e. directing said food and vines rearward on a recovery conveyor traveling along said plane for separation of additional food from said vines;
   f. retrieving said additional food from the recovery conveyor and directing it forward along said plane for further processing;
   g. directing food separated from the vines rearward over an upwardly blowing adjustable volume of air located along said vertical plane; and
   h. directing said air blown food rearward along said vertical plane.

18. The method of claim 17 comprising the additional step of hand sorting the food on a discharge conveyor.

19. A method for recovering above-ground vine-borne food along a path on a vertical plane extending generally down the middle from front to rear inside a machine, comprising the steps of:
   a. collecting entangled food and vines onto a main frame;
   b. directing the entangled food and vines rearward along said vertical plane to a shaker brush having a plurality of tines;
   c. inducing a shaking action in the vines, causing a separation of at least some of the food from the vines;
   d. retrieving dislodged food fallen from the shaker brush with a food conveyor traveling rearward along said vertical plane below the shaker brush;
   e. directing food and vines rearward to a recovery conveyor traveling along said plane for separation of additional food from said vines;
   f. retrieving said additional food from the recovery conveyor and directing it forward along said vertical plane for further processing;
   g. directing food separated from the vines rearward beneath an upper suction unit providing an adjustable volume of air located along said vertical plane; and
   h. directing said air treated food rearward along said vertical plane.

20. A machine for harvesting vine-borne crops along a path on a vertical plane extending from front to rear inside the machine comprising:
   a. a self-propelled harvester main frame;
   b. at least one feeder conveyor traveling along said vertical plane for bringing severed vines with crops rearward along said path to a shaker brush in said machine;
   c. a recovery conveyor traveling along said vertical plane adjacent to said shaker brush for conveying shaken vines away from the shaker brush along said vertical plane toward the back of the machine;
   d. a removal conveyor traveling along said vertical plane having a portion thereof located below the shaker brush for collecting dislodged crops from the shaker and conveying them rearward along said path, said removal conveyor terminating inside said machine;
   e. a crop return deployed underneath said recovery conveyor traveling along said plane for bringing additional crops that have been dislodged from the vines forward to the removal conveyor;
   f. a sorter conveyor traveling along said vertical plane for conveying dislodged crops rearward along said path, one end of said conveyor adjacent to the termination of said removal conveyor defining a gap therebetween, said gap extending across said path; and
   g. an upper air suction unit having an input opening located along said vertical plane above said gap for separating said unwanted materials from said crops.

21. The machine of claim 20 wherein said upper suction unit comprises a removal fan having an orientation that is approximately perpendicular to said vertical plane, said fan being in communication with said input opening through a duct.

22. The machine of claim 21 wherein said input opening is shaped so that a consistent volume of air suction is provided across its width above said dislodged crops.

23. The machine of claim 20 wherein said upper suction unit comprises a pair of suction fans, one fan being located on each side of said machine.

24. The machine of claim 20 wherein at least one rotatable roller is provided adjacent to said input opening for dislodging said unwanted materials from said crops.

25. The machine of claim 20 wherein a second feeder conveyor is provided between the first feeder conveyor and the shaker traveling along said plane defining a second adjustable gap between said feeder conveyors through which materials may drop.

26. The machine of claim 25 wherein a debris conveyor is provided underneath said second gap for conveying materials falling through said gap away from the machine.

27. The machine of claim 20 further comprising a cross conveyor located above said sorter conveyor for directing said unwanted materials away from said machine.

28. A machine for harvesting vine-borne crops along a path on a vertical plane extending from front to rear inside the machine comprising:
   a. a self-propelled harvester main frame;
   b. a feeder conveyor traveling along said vertical plane for bringing severed vines with crops rearward along said path to a shaker brush in said frame;
   c. a recovery conveyor traveling along said vertical plane adjacent to said shaker brush for conveying shaken vines away from the shaker brush along said vertical plane toward a rear end of said frame;
   d. a removal conveyor traveling along said vertical plane having a portion thereof located below the shaker brush for collecting dislodged crops from the shaker and conveying them along said path toward the rear, said removal conveyor terminating inside said machine;
   e. a crop return deployed underneath said recovery conveyor traveling along said plane for bringing additional crops that have been dislodged from the vines forward to the removal conveyor;
   f. a cleaner located along said vertical plane at an end of said removal conveyor for separating unwanted materials from said dislodged crops; and
   g. a sorter conveyor traveling along said vertical plane between the cleaner and the rear for transporting dislodged crops rearward along said vertical plane.

29. The machine of claim 28 wherein said cleaner comprises an upper suction unit.

30. The machine of claim 29 wherein said cleaner further comprises a lower blower having a nozzle located beneath said upper suction unit.

31. The machine of claim 30 wherein said lower blower nozzle further comprises a movable flap, and wherein a sensor is provided for detecting a clog in said suction unit and communicating a signal to activate said flap in the event of such a clog.

32. The machine of claim 28 wherein said cleaner comprises a lower blower having a nozzle.

33. A machine for harvesting vine-borne crops along a path on a vertical plane extending from front to rear inside the machine comprising:
   a. a feeder conveyor for bringing severed vines with crops along said vertical plane to a shaker brush in said frame;
   b. a recovery conveyor traveling along said vertical plane adjacent to said shaker brush for conveying shaken vines away from the shaker brush along said vertical plane toward a rear end of said frame;
   c. a removal conveyor traveling along said vertical plane having a portion thereof located below the shaker brush for collecting dislodged crops from the shaker and conveying them along said path toward the rear, said removal conveyor terminating inside said machine;
   d. a crop return deployed underneath said recovery conveyor traveling along said plane for bringing additional crops that have been dislodged from the vines forward to the removal conveyor;
   e. a cleaner located along said vertical plane at an end of said removal conveyor for separating unwanted materials from said dislodged crops, said cleaner comprising an upper suction unit, a lower blower and nozzle below said suction unit, a movable flap on said nozzle, and a sensor for detecting a clog in said suction unit for communicating a signal to activate said flap in the event of such a clog, and
   f. a sorter conveyor traveling along said vertical plane between the cleaner and the rear for transporting dislodged crops rearward along said vertical plane.

34. A method for harvesting vine-borne crops along a path extending generally down the middle from front to rear inside a machine comprising the following steps that are performed along a single vertical plane:
   a. conveying crop-laden vines that have been severed from the earth along said vertical plane to a shaker;
   b. shaking said crop-laden vines to dislodge crop therefrom;
   c. conveying said shaken vines along said plane away from said shaker;
   d. separating additional crop from said shaken vines while traveling along said plane;
   e. retrieving said additional crop and directing it toward said shaker along said plane;
   f. collecting said dislodged crop and said additional crop and conveying it along said plane away from said shaker;
   g. separating unwanted materials from said crop and said additional crop as it travels along said plane; and
   h. conveying said separated crop along said plane to a sorter.

35. The method of claim 34 wherein said separating step comprises passing said crop across an upwardly directed adjustable high volume of air.

36. The method of claim 35 wherein said separating step further comprises directing said crop beneath an upper suction unit providing an adjustable high volume of air.

37. The method of claim 34 wherein said separating step comprises directing said crop beneath an upper suction unit providing an adjustable high volume of air.

38. The method of claim 34 wherein the conveying of shaken vines, the separating of dislodged crop, and the conveying said separated crop all intersect an axis along said vertical plane.

39. The method of claim 34 comprising the additional steps of:
   h diverting said unwanted materials onto a transverse conveyor; and
   i directing said materials to a side of the machine.

40. A method for recovering above-ground vine-borne food along a path on a vertical plane extending from front to rear inside a machine, comprising the steps of:
   a. collecting food and vines onto a main frame;
   b. directing the food and vines along a vertical plane to a shaker brush having a plurality of tines;
   c. inducing a shaking action in the vines, causing a separation of at least some of the food from the vines;
   c. conveying said shaken vines along said plane away from said shaker;
   d. separating additional food from said shaken vines while traveling along said plane;
   e. retrieving said additional food and directing it toward said shaker along said plane;
   f. retrieving said dislodged food fallen from the shaker brush and said additional food with a food conveyor traveling along said vertical plane below the shaker brush;
   g. directing said retrieved food through a cleaner located along said vertical plane to remove unwanted materials; and
   h. directing said cleaned food along said vertical plane into a sorter.

41. A machine for processing vine-borne crops along a path on a vertical plane extending from front to rear inside the machine comprising:
 a. a self-propelled harvester main frame;
 b. a feeder conveyor traveling along said vertical plane for transporting severed vines with crops rearward along said path to a shaker brush;
 c. a removal conveyor traveling along said vertical plane having a portion thereof located below said shaker brush for collecting dislodged crops and conveying them rearward along said path, said removal conveyor terminating inside said machine;
 d. a sorter conveyor traveling along said vertical plane for conveying dislodged crops rearward along said path, one end of said sorter conveyor adjacent to the termination of said removal conveyor defining a gap therebetween, said gap extending across said path;
 e. a cleaner located along said vertical plane adjacent to said gap for separating unwanted materials from said dislodged crops;
 f. a recovery conveyor traveling along said vertical plane adjacent to said shaker brush and above said sorter conveyor for conveying shaken vines rearward along said path; and
 g. a crop return traveling along said vertical plane below said recovery conveyor for transporting crops dislodged in said recovery conveyor forward along said path to said removal conveyor.

42. The machine of claim 41 wherein said cleaner extends across said gap for separating unwanted materials from said dislodged crops as they cross said gap.

43. The machine of claim 41 wherein said cleaner comprises an air blower located along said vertical plane below said gap, said blower having a narrow nozzle outlet extending to said gap for blowing air through said gap.

44. The machine of claim 43 wherein said cleaner further comprises an upper air suction unit having an input opening located along said vertical plane above said blower nozzle for receiving said unwanted materials.

45. The machine of claim 41 wherein said cleaner comprises an upper air suction unit having an input opening located along said vertical plane above an end of said removal conveyor for receiving said unwanted materials.

46. The machine of claim 41 further comprising a rotatable roller located adjacent to said cleaner to prevent clogging of said cleaner.

47. The machine of claim 41 wherein said recovery conveyor, sorter conveyor and crop return all intersect a vertical axis along said vertical plane.

48. The machine of claim 41 wherein said cleaner comprises an upwardly blowing airflow extending across said path.

49. The machine of claim 48 wherein said recovery conveyor, airflow, sorter conveyor and crop return all intersect a vertical axis along said vertical plane.

50. A method for processing vine-borne crops along a path on a vertical plane extending from front to rear inside a machine comprising the steps of:
 a. conveying crop-laden vines upward along a vertical plane and depositing them into a shaker;
 b. shaking said crop-laden vines to dislodge crop therefrom;
 c. conveying said shaken vines away from said shaker along said plane on an upper recovery conveyor having a plurality of openings therein;
 d. retrieving additional crop dislodged from said shaken vines and directing it toward said shaker along said plane using a crop return;
 e. conveying all of said dislodged crop away from said shaker along said vertical plane on a lower conveyor;
 f. cleaning said dislodged crop as it travels along said vertical plane to separate unwanted materials from said crop; and
 g. conveying said cleaned crop along said plane away from said shaker.

51. The method of claim 50 wherein said cleaning step further comprises directing said crop across an upwardly directed adjustable high volume of air located along said plane.

52. The method of claim 51 wherein said cleaning step further comprises directing said crop underneath an adjustable overhead high-volume air suction located along said plane.

53. The method of claim 50 wherein said cleaning step further comprises directing said crop underneath an adjustable overhead high-volume air suction located along said plane.

54. The method of claim 50 wherein the conveying shaken vines, the retrieval of crops, the cleaning of dislodged crop, and the conveying said cleaned crop all intersect an axis along said vertical plane.

* * * * *